United States Patent
Salvino et al.

(10) Patent No.: US 12,434,251 B1
(45) Date of Patent: Oct. 7, 2025

(54) ELECTROSTATIC FILTRATION ARRANGEMENT

(71) Applicant: LUNAR HELIUM-3 MINING, LLC, Scottsdale, AZ (US)

(72) Inventors: Chris Salvino, Scottsdale, AZ (US); Drew F DeJarnette, San Diego, CA (US); Paul A Beatty, Fort Collins, CO (US); Andrew Dummer, Chapel Hill, NC (US)

(73) Assignee: LUNAR HELIUM-3 MINING, LLC, Scottsdale, AZ (US)

( * ) Notice: Subject to any disclaimer, the term of this patent is extended or adjusted under 35 U.S.C. 154(b) by 0 days.

(21) Appl. No.: 19/212,545

(22) Filed: May 19, 2025

Related U.S. Application Data

(63) Continuation-in-part of application No. 19/016,762, filed on Jan. 10, 2025, which is a continuation-in-part of application No. 18/894,605, filed on Sep. 24, 2024, now Pat. No. 12,226,735, which is a continuation-in-part of application No. 18/766,818, filed on Jul. 9, 2024, now Pat. No. 12,186,699.

(51) Int. Cl.
| | |
|---|---|
| *B03C 3/41* | (2006.01) |
| *B03C 3/019* | (2006.01) |
| *B03C 3/08* | (2006.01) |
| *B03C 3/47* | (2006.01) |
| *B03C 3/66* | (2006.01) |
| *E21C 51/00* | (2006.01) |

(52) U.S. Cl.
CPC ............... *B03C 3/41* (2013.01); *B03C 3/019* (2013.01); *B03C 3/08* (2013.01); *B03C 3/47* (2013.01); *B03C 3/66* (2013.01); *B03C 2201/04* (2013.01); *E21C 51/00* (2013.01)

(58) Field of Classification Search
CPC .. B03C 3/41; B03C 3/019; B03C 3/08; B03C 3/47; B03C 3/66; B03C 2201/04; E21C 51/00
USPC .......................... 95/57; 96/54, 55, 57, 58, 97
See application file for complete search history.

(56) References Cited

U.S. PATENT DOCUMENTS

| | | | | |
|---|---|---|---|---|
| 3,250,060 A | * | 5/1966 | Luik, Jr. ................... | B03C 3/04 55/296 |
| 4,203,948 A | * | 5/1980 | Brundbjerg ............... | A61L 9/22 422/240 |

(Continued)

OTHER PUBLICATIONS

Rice, Development of Lunar Ice/Hydrogen Recovery System Architecture, Jan. 1, 2000, p. 36, NIAC, Madison, WI.

*Primary Examiner* — Frank M Lawrence, Jr.
(74) *Attorney, Agent, or Firm* — Kenneth Altshuler

(57) ABSTRACT

Described is a particle filtration system that protects a gas segregation region from lunar regolith dust by using an electrostatic filter arrangement. An ionizing element (screen or bar, for example) generates one or more electron curtains that charge neutral dust particles, which are then drawn to paired conductive plates via electrostatic attraction. The system operates efficiently in vacuum conditions, leveraging field emission from sharp triangular apexes of the ionizing element/s to create high-density electron streams. A final-stage ULPA mesh filter captures any remaining particles, ensuring only gas enters the gas segregation region. This design enhances dust mitigation, improves gas collection efficiency, and protects sensitive components in harsh extraterrestrial environments.

20 Claims, 21 Drawing Sheets

(56) References Cited

U.S. PATENT DOCUMENTS

| | | | |
|---|---|---|---|
| 4,227,894 A * | 10/1980 | Proynoff | F24F 8/192 |
| | | | 361/231 |
| 5,168,158 A | 12/1992 | McComas et al. | |
| 7,514,694 B2 | 4/2009 | Stephan et al. | |
| 7,919,758 B2 | 4/2011 | Stephan et al. | |
| 8,330,115 B2 | 12/2012 | Frank | |
| 9,134,047 B2 | 9/2015 | Black et al. | |
| 9,261,468 B2 | 2/2016 | Bingham et al. | |
| 9,599,729 B2 | 3/2017 | Roscoe et al. | |
| 10,222,121 B2 | 3/2019 | Cullinane et al. | |
| 11,624,542 B2 | 4/2023 | Sung | |
| 11,725,836 B2 | 8/2023 | Mäkipää et al. | |
| 12,186,699 B1 * | 1/2025 | Salvino | F25J 1/02 |
| 12,226,735 B1 * | 2/2025 | Salvino | B01D 59/48 |
| 2002/0066288 A1 | 6/2002 | Greatbatch | |
| 2013/0034198 A1 | 2/2013 | Chandrasekharan et al. | |
| 2022/0249802 A1 | 8/2022 | Allen et al. | |
| 2023/0411134 A1 | 12/2023 | Ryan et al. | |
| 2024/0035379 A1 | 2/2024 | Grillos | |
| 2025/0025890 A1 * | 1/2025 | Bologa | B03C 3/09 |

\* cited by examiner

ELECTROSTATIC FILTRATION ARRANGEMENT

CROSS-REFERENCE TO RELATED APPLICATIONS

This is a continuation-in-part application which claims priority to and the benefit of U.S. patent application Ser. No. 19/016,762 entitled: PROGRESSIVELY CHILLED GAS SEPARATION TANKS filed on Jan. 10, 2025, the entire disclosure of which is hereby incorporated by reference, which is a continuation-in-part application which claims priority to and the benefit of U.S. Pat. No. 12,226,735 (issued Feb. 18, 2025) from U.S. patent application Ser. No. 18/894,605 entitled: IONIZED GAS SEPARATION ARRANGEMENT filed on Sep. 24, 2024, the entire disclosure of which is hereby incorporated by reference, which is a continuation-in-part application claiming priority to and the benefit of U.S. Pat. No. 12,186,699 from U.S. patent application Ser. No. 18/766,818 (issued Feb. 18, 2025) entitled: CRYOGEN CHAMBER WITH ADSORBER, filed on Jul. 9, 2024, the entire disclosure of which is hereby incorporated by reference.

BACKGROUND OF THE INVENTION

1. Field of the Invention

The present invention relates generally to electrostatic filtration when mining extraterrestrial sites for gas trapped in extraterrestrial soil.

2. Description of Related Art

Helium-3 (He-3) holds immense potential as a clean and efficient energy source, offering numerous benefits for various applications. It has been discovered that He-3 is a highly efficient fuel for nuclear fusion, which has the potential to provide a nearly limitless and environmentally friendly energy solution. When He-3 fuses with deuterium, it produces a helium atom, a proton, and a tremendous amount of energy. Unlike traditional nuclear fission, fusion reactions release energy without generating hazardous radioactive waste or greenhouse gas emissions. Harnessing He-3 for fusion could revolutionize the energy landscape, providing a stable and sustainable source of power for the future.

However, despite its remarkable benefits, mining He-3 on Earth faces significant limitations. For one thing, He-3 is incredibly scarce on our planet. It is primarily found in minute quantities in the top surfaces of lunar soil, known as regolith, and is sparsely present in the Earth's atmosphere. Consequently, the extraction of He-3, whether on Earth or the Moon, is challenging and expensive. Moreover, mining it on the Moon poses logistical difficulties requiring advanced technologies and significant investments. Even assuming mining on the Moon is successful, transporting the mined He-3 from the Moon to Earth presents significant technical challenges and high costs. These limitations highlight the need for further research and development to find more accessible and cost-effective sources of He-3 or to explore alternative fusion fuel options that do not rely solely on He-3.

The subject matter disclosed herein is generally directed to innovations related to collecting He-3 and other useable gaseous elements on extra-terrestrial bodies.

SUMMARY OF THE INVENTION

The present invention relates generally to electrostatic filtration when mining extraterrestrial sites for gas trapped in extraterrestrial soil.

In that context, one embodiment of the present invention contemplates an apparatus for mitigating particle ingress into a gas segregation region. The apparatus includes a particle intake chamber having an inlet region in gas communication with the gas segregation region. Disposed within the chamber is at least one electron emitter bar, which comprises tapering sidewalls that terminate at an apex. A power source is electrically coupled to the electron emitter bar and is configured to apply a voltage sufficient to emit a curtain of electrons from the apex, which negatively charge dust particles passing through the electron curtain. Also coupled to the power source are a plurality of paired particle retention surfaces positioned between the electron emitter bar and the gas segregation region. These particle retention surfaces are configured to receive and retain the negatively charged particles when a potential voltage difference is applied to them by the power source.

Another embodiment of the present invention contemplates a particle mitigation arrangement that includes a particle intake chamber having an inlet region in gas communication with a gas segregation region. Disposed within the chamber is at least one electron emitter bar, which comprises tapering sidewalls that terminate at an apex. A power source is electrically coupled to the electron emitter bar and is configured to emit a curtain of electrons from the apex to negatively charge dust particles as they pass through the electron curtain. A plurality of particle retention surface pairs are positioned between the electron emitter bar and the gas segregation region. The power source is also configured to maintain a voltage potential difference between each of the particle retention surface pairs to attract and retain the negatively charged particles.

Yet another embodiment of the present invention contemplates an electrostatic particle filter that includes a particle intake chamber having an inlet region in gas communication with a gas segregation region. Within the chamber is an electron emitter bar, which has an apex oriented horizontally. A direct current source is electrically connected to the emitter bar. A plurality of parallel particle retention surface pairs are also connected to the direct current source and are positioned between the emitter bar and the gas segregation region. The direct current source is configured to maintain each of the particle retention surface pairs at a voltage potential difference.

Another embodiment of the present invention contemplates a method is provided for repelling iron-based regolith particles in a particle filtration system. The method includes providing a particle intake chamber that is in fluid communication with a gas segregation region. A planar array of conductive wires is suspended across an internal passageway of the intake chamber. Alternating current is delivered to the conductive wires using a power supply, with the alternating current being phase shifted between adjacent wires of the conductive wire array. This alternating current generates a time-varying magnetic field, which in turn produces an electromagnetic force. The method continues by repelling the iron-based dust particles laterally away from the gas segregation region using the electromagnetic force generated by the time-varying magnetic field.

And, another embodiment of the present invention contemplates a particle repelling arrangement that comprises a particle intake chamber having an inlet region in fluid communication with a gas segregation region. A particle repelling screen is positioned across an internal passageway of the intake chamber. The screen includes a planar array of conductive wires, each wire spaced apart from the next to define particle passageways. A power supply is electrically coupled to the conductive wires. The power supply is configured to deliver alternating current to the wires. The alternating current is phase-shifted between adjacent wires. This generates a time-varying magnetic field configured to induce electromagnetic repulsive forces that displace iron-based regolith particles laterally away from the gas segregation region.

Still, another embodiment of the present invention contemplates an apparatus for repelling iron-based lunar dust particles that comprises a particle intake chamber that includes an inlet region in fluid communication with a gas segregation region. Within the internal passageway of the intake chamber, a particle repelling screen is suspended. The screen comprises a planar array of conductive wires that are arranged in parallel and spaced apart to form particle passageways. A power supply is electrically coupled to the conductive wires and is configured to deliver an alternating current to each of the wires. The alternating current is phase-shifted relative to adjacent wires creating a time-varying magnetic field that is electromagnetically paired with the alternating current. This magnetic field is configured to generate repulsive forces that displace the iron-based lunar dust particles laterally away from the gas segregation region.

DETAILED DESCRIPTION

Figure 1A:
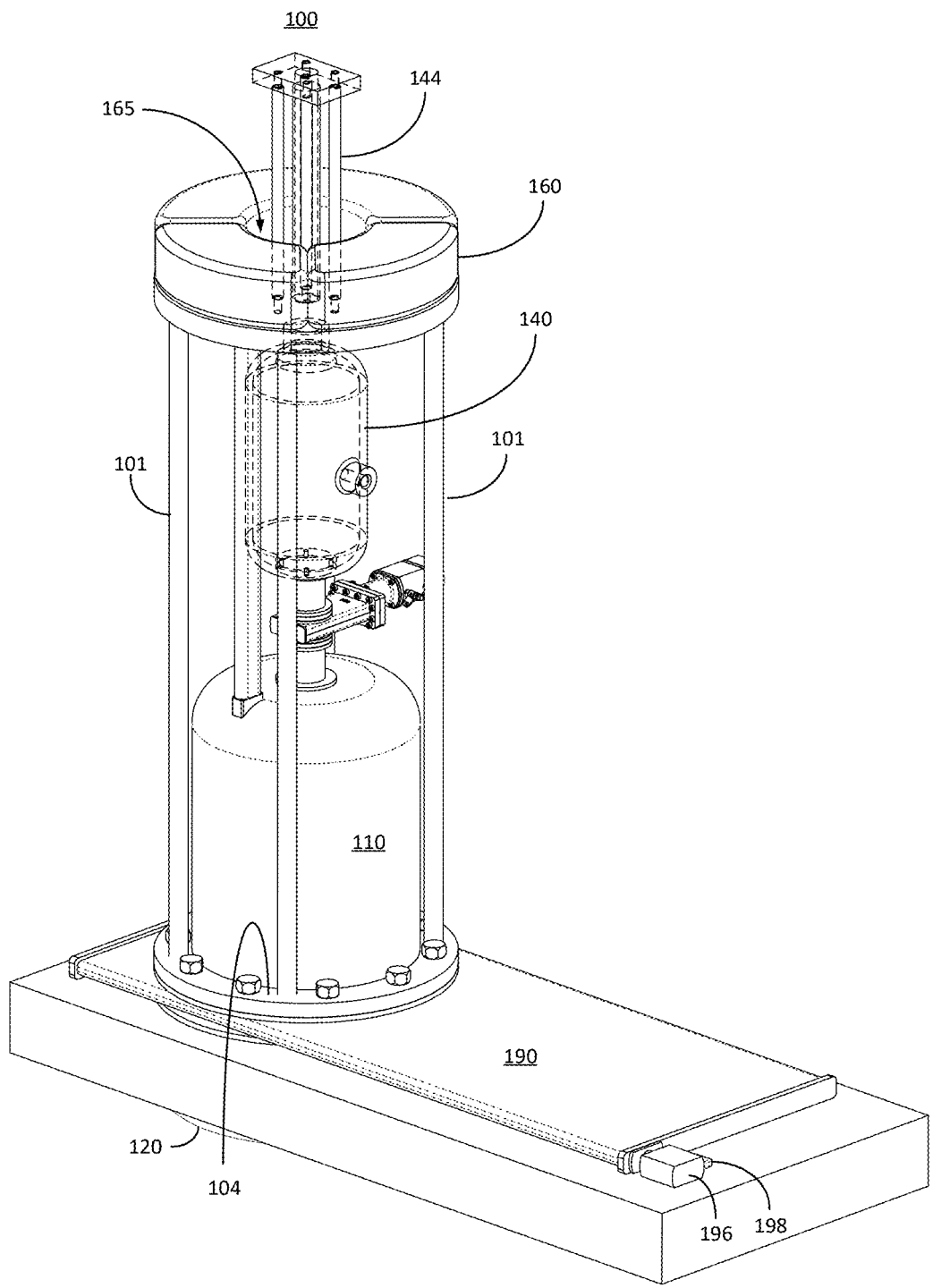
FIGS. 1A and 1B are line drawings of isometric views of the gas capturing arrangement depicting the base open and closed consistent with embodiments of the present invention.

Initially, this disclosure is by way of example only, not by limitation. Thus, although the instrumentalities described herein are for the convenience of explanation, shown and described with respect to exemplary embodiments, it will be appreciated that the principles herein may be applied equally in other similar configurations involving the subject matter directed to the field of the invention. The phrases "in one embodiment", "according to one embodiment", and the like, generally mean the particular feature, structure, or characteristic following the phrase, is included in at least one embodiment of the present invention and may be included in more than one embodiment of the present invention. Importantly, such phrases do not necessarily refer to the same embodiment. If the specification states a component or feature "may", "can", "could", or "might" be included or have a characteristic, that particular component or feature is not required to be included or have the characteristic. As used herein, the terms "having", "have", "including" and "include" are considered open language and are synonymous with the term "comprising". Furthermore, as used herein, the term "essentially" is meant to stress that a characteristic of something is to be interpreted within acceptable tolerance margins known to those skilled in the art in keeping with typical normal world tolerance, which is analogous with "more or less." For example, essentially flat, essentially straight, essentially on time, etc. all indicate that these characteristics are not capable of being perfect within the sense of their limits. Accordingly, if there is no specific+/−value assigned to "essentially", then assume essentially means to be within +/−2.5% of exact. The term "connected to" as used herein is to be interpreted as a first element physically linked or attached to a second element and not as a "means for attaching" as in a "means plus function". In fact, unless a term expressly uses "means for" followed by the gerund form of a verb, that term shall not be interpreted under 35 U.S.C. § 112(f). In what follows, similar or identical structures may be identified using identical callouts.

With respect to the drawings, it is noted that the figures are not necessarily drawn to scale and are diagrammatic in nature to illustrate features of interest. Descriptive terminology such as, for example, upper/lower, top/bottom, horizontal/vertical, left/right and the like, may be adopted with respect to the various views or conventions provided in the figures as generally understood by an onlooker for purposes of enhancing the reader's understanding and is in no way intended to be limiting. All embodiments described herein are submitted to be operational irrespective of any overall physical orientation unless specifically described otherwise, such as elements that rely on gravity to operate, for example.

Described herein are embodiments directed to collecting vaporize gaseous atoms and molecules in an extremely low-pressure environment and collecting those vaporized gaseous atoms and molecules using cryogenically cooled surfaces, such as plates. Extremely low-pressure environment is defined herein as below $1 \times 10^{-5}$ bars, wherein pressure at sea-level on Earth is approximately 1 bar. Aspects of the present invention consider mining gaseous atoms and molecules on extraterrestrial bodies such as the Moon, asteroids, moons orbiting other planets, etc., for example. Many of these extraterrestrial bodies have little to no ambient pressure at or just beyond their surfaces and depending on the size of the extraterrestrial body have a significantly lower gravitational pull than that experienced on Earth.

Though embodiments of the present invention can be used in conjunction with many different extraterrestrial bodies, it is one object of the present invention to focus on mining gaseous atoms and molecules (materials) from the Moon. The Moon's atmosphere (the surface boundary exosphere) has a pressure of about $3 \times 10^{-15}$ bars and can range in temperature between 20° to 400° Kelvin. In the interest of continued exploration of the Moon as well as maintaining long-term residents on the Moon, extracting or otherwise mining important gaseous materials from the Moon, such as oxygen, nitrogen, hydrogen, and helium, for example, reduces the dependency of transporting such gaseous materials from the Earth. Moreover, helium-3, a light stable isotope of helium having two protons and one neutron, which has promise as an important constituent in fusion reactions, is far more abundant on the Moon than the Earth. In some estimates, helium-3 is more than a thousand times more abundant on the Moon than compared to the Earth making the Moon a better target to obtain helium-3.

Certain embodiments of the present invention envision extracting target gaseous materials from the Moon by heating up moon regolith (lunar soil/minerals) to gas vaporizing temperatures defined as temperatures that are high enough to liberate/vaporize these target gaseous materials from moon regolith, or simply "regolith". The vaporized target gaseous materials are then collected as liquid from condensation surfaces that are at or below the condensation temperatures corresponding to each of the target gaseous materials. When condensed i.e., liquefied, the liquid or frozen, which improves the transportation of these target materials.

In that light, some embodiments of the present invention contemplate a vapor collection system that segregates higher temperature condensing vapor, such as hydrogen, oxygen, and nitrogen, from lower temperature condensing vapor, such as helium, that can be used at an extra-terrestrial body to collect target gaseous atoms and molecules that are floating around in a shielded environment at a pressure at or less than $1 \times 10^{-5}$ bar.

Presented below are also embodiments of a segregating gas arrangement that generally comprises a gas segregation chamber, at least one cooling plate in the gas segregation chamber, and a carbon adsorber in an adsorption gas capturing chamber. The gas segregation chamber has a rim that when resting atop regolith defines a first interior environment. The cooling plates are in the gas segregation chamber, wherein the cooling plates are maintained at a first temperature above 5° K, which is a condensation temperature that higher temperature condensing gases will condense. The adsorption gas capturing chamber defines a second interior environment that is in communication with the first interior environment. The carbon adsorber is in the second interior environment and is maintained at a second temperature below 3° K. The carbon adsorber is configured to capture the low temperature condensing gas.

Also presented below are embodiments that disclose a gas separation arrangement for separating and containing various types of gas received from a collection chamber. In certain embodiments, the gas separation arrangement is envisioned to assist in mining select gases from the Moon. The arrangement includes plurality of progressively chilled separation tanks that successively substantially separate out different species of gas (such as 80% separation). The separation tanks are connected to and receive the various gas species from the collection chamber. Each separation tank can have an independent heat exchanger that maintains the respective separation tank at a temperature that selectively liquefies/precipitates out a target species of gas allowing the remaining gas to move to a successive separation tank. Ultimately, He-3 and He-4 are separated from one another to be collected, like the other gas species.

Figure 1B:
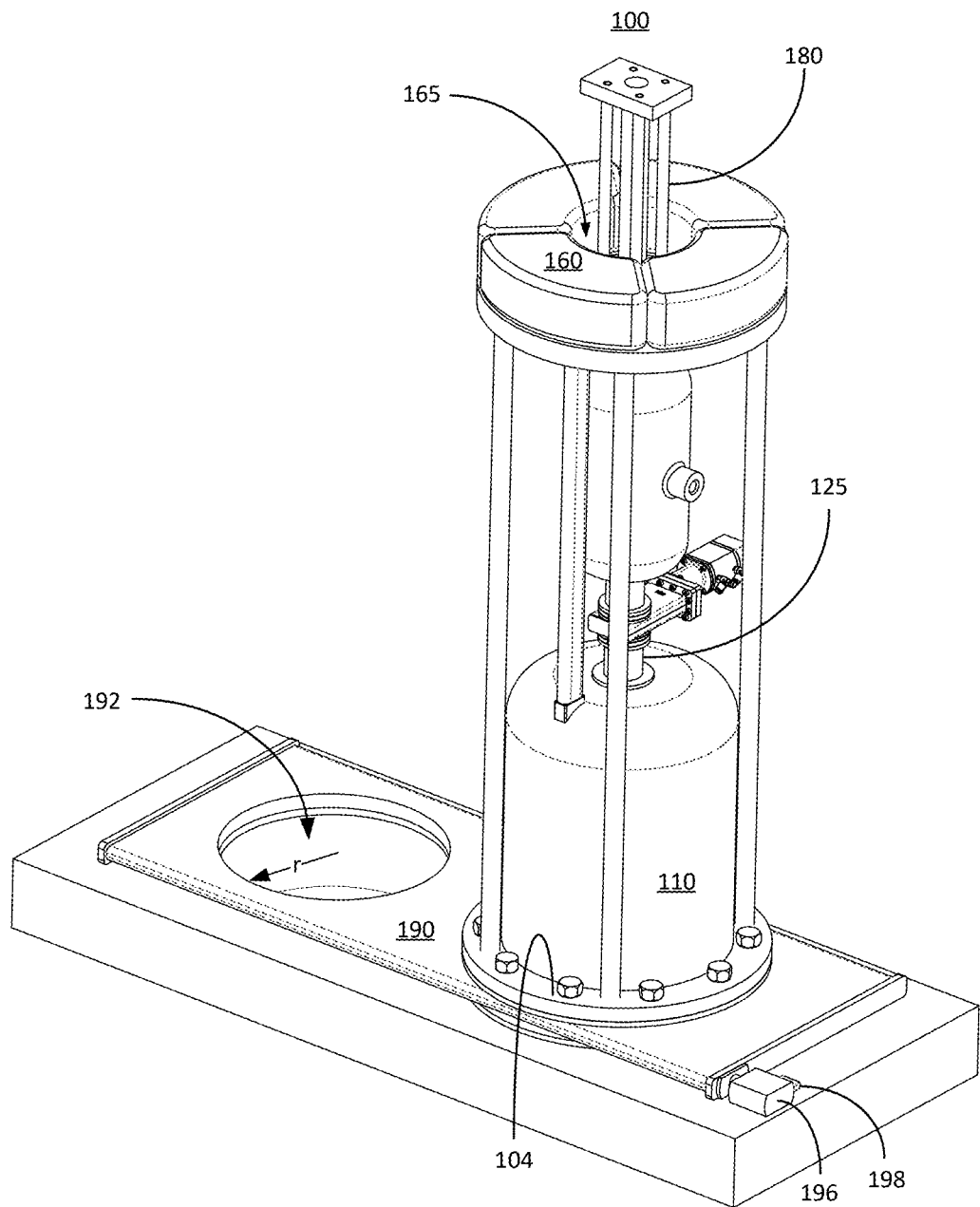

With respect to FIGS. 1A and 1B, the reservoir 160 is shown connected to and supported by the gas capturing arrangement base 104 via support legs 101, however a skilled artisan will immediately appreciate that there are numerous other ways of supporting a reservoir 160 to the gas capturing arrangement 100 without departing from the scope and spirit of the present invention. The carbon adsorber 145 and in some cases the entire adsorption gas capturing chamber 140 can be removed by an adsorber access arm 180 via an access port 165 in the reservoir 160, which would be done after the upper gate valve 124 closes off the connecting passageway 125. A sliding gas segregation chamber gate valve gate 190 (door) is interposed between the gas capturing arrangement base 104 and a rim 120 that is arranged and configured to rest atop a granular surface 200, such as regolith. The sliding gas segregation chamber door 190 comprises an inlet aperture 192 that is aligned with an intake port 121 defined as the space within the inside boundary of the rim 120. The sliding gas segregation chamber door 190 can be actuated by a motor 196 that can be electrically connected to a power source (not shown) via an electrical connector 198. It should be appreciated that though motors, electronics, computers, algorithms may not be shown, such elements can be employed to enhance the functionality of the embodiments described below, however their absence does not change the fundamental functionality of the embodiments to enable the reader to appreciate the scope of the ideas presented herein.

Figure 1C:
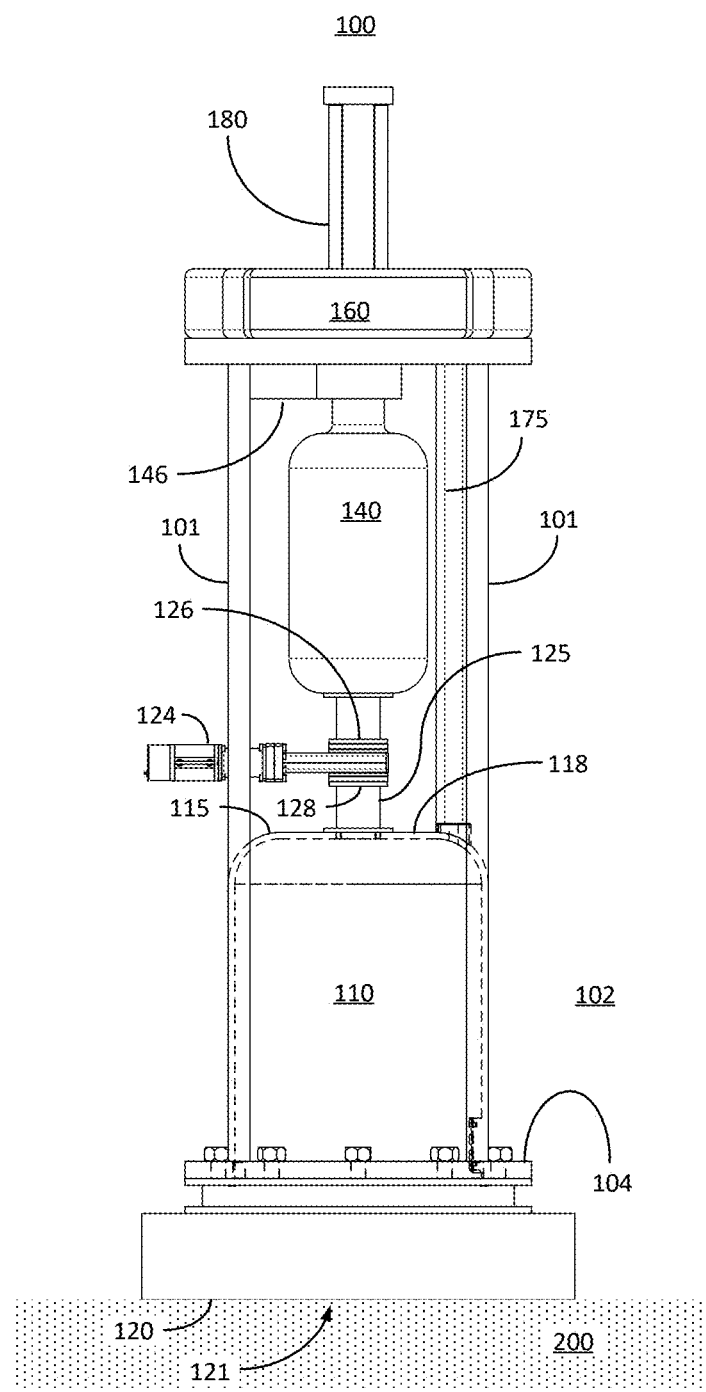
FIG. 1C is a line drawing of a side view of the gas capturing arrangement consistent with embodiments of the present invention.
Figure 1D:
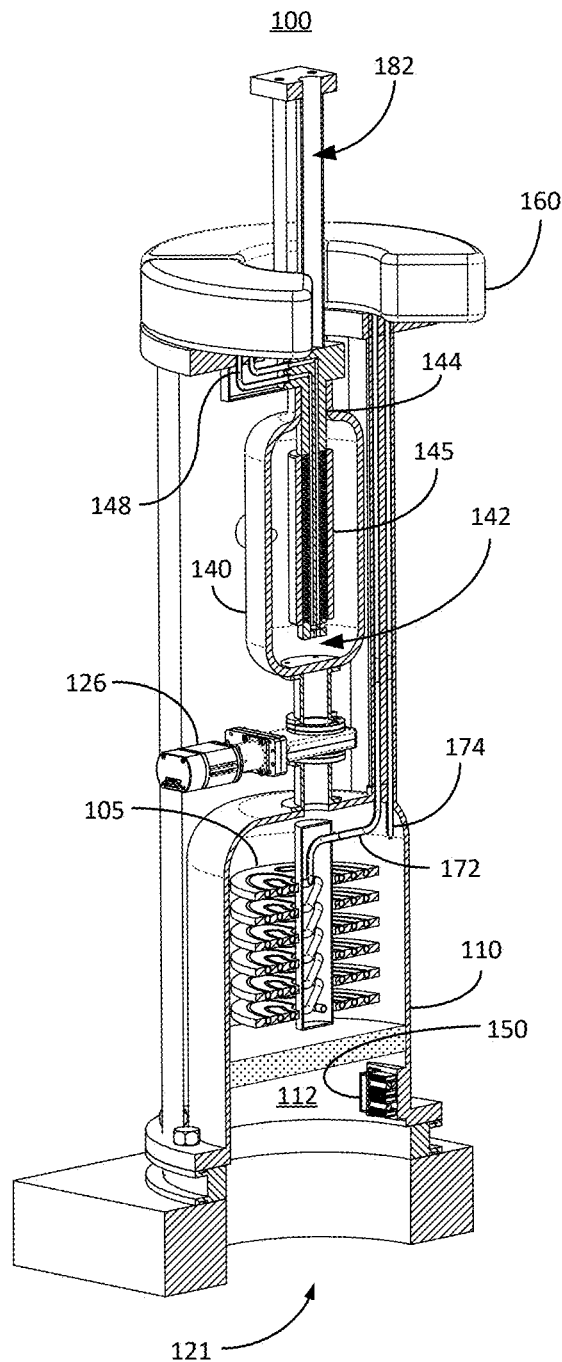
FIG. 1D is a pseudo cross-section line drawing of the gas capturing arrangement consistent with embodiments of the present invention.
Figure 1E:
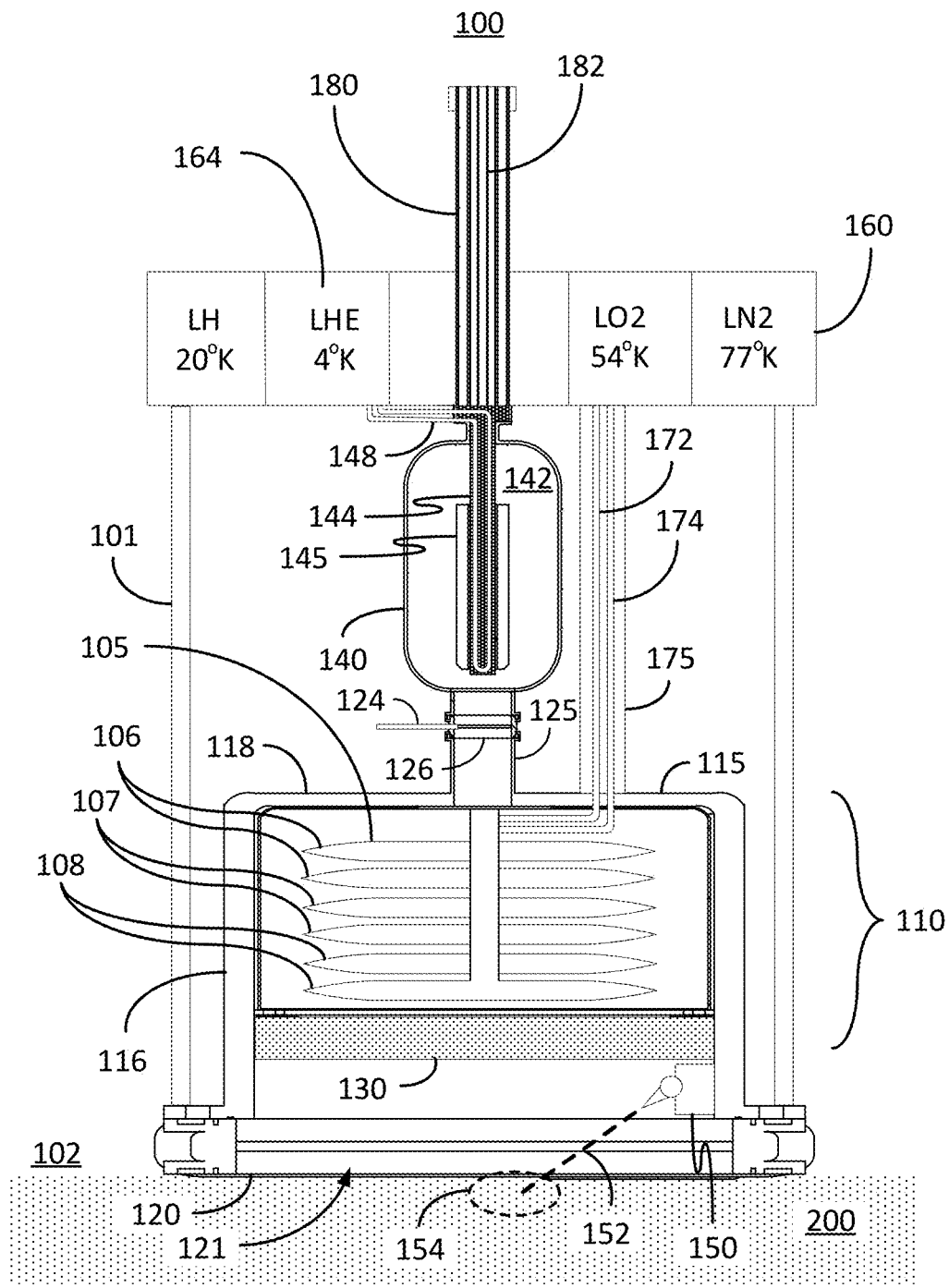
FIG. 1E is a line drawing of a side view cross-section of the gas capturing arrangement from the side view of FIGS. 1C and 1D consistent with embodiments of the present invention.

As shown in FIG. 1C in view of FIGS. 1D and 1E, the gas capturing arrangement 100, and more particularly, the rim 120 is resting on or otherwise in contact with regolith 200. The gas segregation chamber gate valve 190 is open providing communication between the internal segregation chamber environment 112 and the regolith 200 via the inlet region 121, as shown in FIG. 1B. The adsorption gas capturing chamber 140 is connected to the top housing surface 118 of the gas segregation chamber 110 via the connecting passageway 125. The gate 124 of the upper gate valve 126 is open thereby providing communication between the internal segregation chamber environment 112 and the adsorption gas capturing chamber environment 142. When the upper gate valve 126 is closed, the adsorption gas capturing chamber 140 can be separated from the gas segregation chamber 110 at the separation junction 128. The adsorption gas capturing chamber 140 can be lifted from the gas segregation chamber 110 through the access port 165 in the reservoir 160 via the adsorber access arm 180. Liquid cryogen is delivered from the reservoir 160 to the gas segregation chamber 110 via lines in the feed and return line conduit 175 and to the upper chamber heat sink 144 via the lines in upper chamber conduit 146. In the present embodiment, the cryogenic liquid coolant reservoir 160 is held in place relative to the base 104 via the support legs 101.

FIG. 1D is a pseudo cross-section line drawing of the gas capturing arrangement 100 consistent with embodiments of the present invention. Notably, the adsorber 145 is shown in the upper chamber 140. The adsorber 145 is wrapped around and in contact with a heat sink 144, such as a copper block, that is cryogenically cooled by liquid cryogen circulated through feed and return lines 148, the liquid cryogen contained in the cryogenic liquid coolant reservoir 160. The gate valve 126 is configured to close off or open gas communication between the upper and lower chambers 140 and 110. Gas communication is defined as the ability of gas to move from one element or location into another. Cryogenic feed line 172 provides liquid cryogen to the cooling plates 105 in the gas segregation chamber 110 where gas liberated from regolith 200 (via a heater 150 heating the regolith 200) entering the internal segregation chamber environment 112 via the inlet region 121. The liquid cryogen is provided by the cryogenic liquid coolant reservoir/s 160 and circulated through the cooling plates 105 via the feed and return lines 172 and 174.

FIG. 1E is a block diagram of the gas capturing arrangement 100 of FIG. 1D depicting the cross-section of the gas capturing arrangement 100 consistent with embodiments of the present invention. The gas segregation chamber 110 can be configured and arranged like a cryopump with one or more plates 105 that separate out certain types of gases released from the regolith 200 from entering the upper chamber 140. In some embodiments, select gas types can enter the upper chamber, such as H-1, H-2, He-3, He-4, for example.

With more specificity, one embodiment contemplates a plurality of plates 105 with an upper first plate or plates 106 being at a first temperature, a middle second plate or plates 107 maintained at a second temperature, and a lower third plate or plates 108 maintained at a third temperature. This embodiment contemplates the option of the first temperature being colder than the second temperature, the second temperature being colder than the third temperature. In other words, the plates 105 get progressively colder as they near the top housing surface 118. The first temperature can be maintained by pumping a first cryogenic fluid through lines in the first plate or plates 106. The second temperature can be maintained by pumping a second cryogenic fluid through lines in the second plate or plates 107. The third temperature can be maintained by pumping a third cryogenic fluid through lines in the third plate or plates 108. Certain embodiments contemplate the first cryogenic fluid being liquid helium, the second cryogenic fluid being liquid hydrogen, and the third cryogenic fluid being liquid nitrogen.

Another embodiment contemplates one or more plates 105 in the gas segregation chamber 110 being infused with a third cryogenic fluid at a third temperature to segregate out a first gas, such as water vapor, that will condense and freeze on the surface of the one or more plates 105. After a first period of time that is sufficient to segregate out the first gas, the one or more plates 105 can be infused with a second cryogenic fluid at a second temperature to segregate out a second gas, such as nitrogen, that will condense on the surface of the one or more plates 105. After a second period of time that is sufficient to segregate out the second gas, the one or more plates 105 can be infused with a first cryogenic fluid at a first temperature to segregate out a third gas, such as oxygen and hydrogen, that will condense on the surface of the one or more plates 105. The first cryogenic fluid is colder than the second cryogenic fluid, which is colder than the third cryogenic fluid. Certain embodiments contemplate the first cryogenic fluid being liquid helium, the second cryogenic fluid being liquid hydrogen, and the third cryogenic fluid being liquid nitrogen.

Yet another embodiment contemplates the one or more plates 105 in the gas segregation chamber 110 being infused with a single cryogenic fluid, such as liquid helium, that is configured to segregate all gasses out of the gas segregation chamber 110 except helium. In this embodiment, the one or more plates 105 can be maintained at a temperature slightly above the condensation temperature of helium, such as via heat boosts or design of the cryogenic fluid carrying passageways 122 in the cooling plates 105.

The gas segregation chamber 110 is defined within a segregation chamber housing 115. The segregation chamber housing 115 is defined by housing sides 116 that extend from a top housing surface 118 to a rim 120. The segregation chamber housing 115 defines an internal environment 112, which is in communication with an external environment 102 via an inlet region 121 at the rim 120 when the lower gate valve 190 is open. The inlet region 121 is an opening that spans that the rim 120. For example, if the rim 120 is circular with a radius r, the inlet region 121 is the area of the circle ($\pi r^2$). This assumes the inlet aperture 192 in the lower gate valve 190 is open or otherwise not obstructing the inlet region 121. The external environment 102 is defined outside of the housing 115.

The rim 120 is configured and arranged to rest atop a granular surface 200, such as regolith. There can be a filter 130 that is configured to trap regolith dust from entering the internal environment 210 via the inlet region 121. The filter 130 can be a HEPA filter or ULPA filter, for example. Certain embodiments envision to filter but rather the use of magnets with or without ionizers to electromagnetically prevent the regolith dust from entering the internal segregation chamber environment 112.

The gas capturing arrangement 100 can further comprise a heating element 150 configured to emit energy 152 that heats a target volume 154 of regolith 200 at and beyond the rim 120. The heating element 150 can be a laser that emits a laser beam, an ultrasound generator that emits ultrasound, a microwave generator that emits microwaves, a radiant heater that emits radiant heat, etc. When the regolith 200 is heated, gaseous elements are liberated and captured within the gas segregation chamber 110. Some embodiments envision the heating element not being in the gas segregation chamber 110 but rather outside of the gas segregation chamber 110, wherein the externally located heating element directs heat in the regolith 200 under the gas segregation chamber 110.

The adsorption gas capturing chamber 140 is attached to the gas segregation chamber 110 via a connecting passageway 125, which provides communication between the two chambers 110 and 140. In this embodiment, communication can be broken between the internal segregation chamber environment 112 the adsorption gas capturing chamber environment 142 via the gate valve 126 when the gate 124 is closed. Certain embodiments contemplate the adsorption gas capturing chamber 140 being detachable from the gas segregation chamber 110, such as for example at the gate valve 126. Other embodiments contemplate the adsorption gas capturing chamber 140 being directly attached to the gas segregation chamber 110 (that is with no connecting passageway 125 therebetween).

With respect to the adsorption gas capturing chamber 140, disposed therein is a carbon adsorber 145 configured and arranged to capture isolated gas that is not targeted to be captured in the gas segregation chamber 110. The carbon adsorber 145 is comprised of a highly porous carbon that is well known for having a high surface area due to its high porosity. Certain embodiments envision capturing the isolated gas that migrates into the adsorption gas capturing chamber 140 in the pores of the carbon adsorber 145. In the present embodiment, the carbon adsorber 145 is in contact with a heat sink 142, which is maintained at or near the cryogenic temperature of the cryogenic fluid circulating therethrough via the upper chamber cryogen feed and return lines 148. The heat sink 142 is a body at essentially the lowest temperature in the gas capturing arrangement 100. The upper chamber heat sink 144 cools the carbon adsorber 145 by way of conduction to near the temperature of the heat sink 142, within a degree or two Kelvin.

The adsorption gas capturing chamber 140 is connected to an adsorber access arm 180 that can assist in removing the adsorption gas capturing chamber 140 from the gas capturing arrangement 100. Certain embodiments envision a duct 182 inside of the adsorber access arm 180 configured to pull gas collected in the carbon adsorber 145 for storage and transport via a secondary gas receiving system (not shown).

Figure 2A:
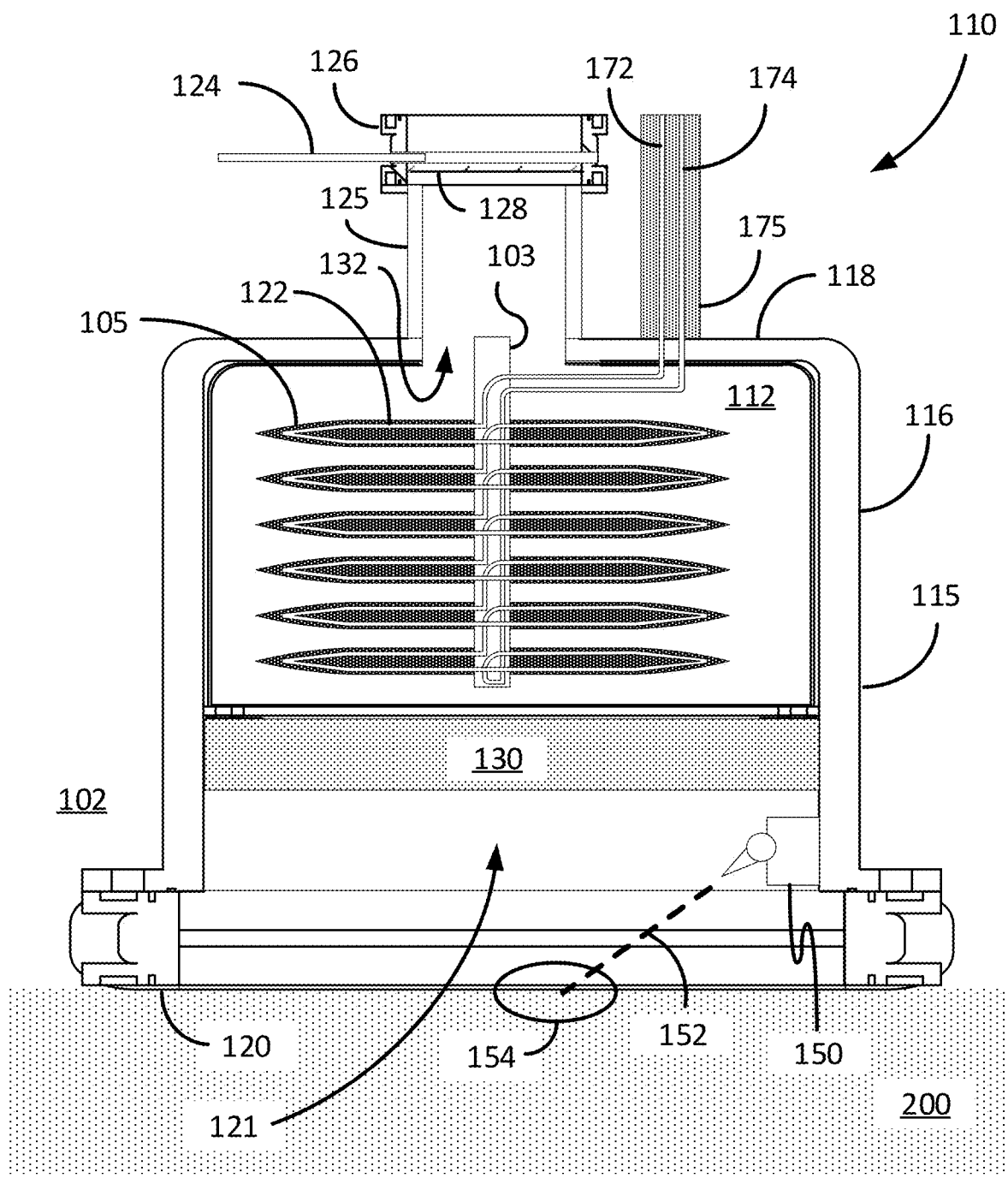
FIG. 2A is a line drawing of a cross-section view of the gas segregation chamber consistent with embodiments of the present invention.

FIG. 2A is a line drawing of a cross-section view of the gas segregation chamber 110 consistent with embodiments of the present invention. FIG. 2A is in view of FIG. 1C identifying associated elements called out. In this embodiment, there are six cooling plates 105 attached to one another via a stem 103 extending through the center of the cooling plates 105. The stem 103 can attach to the segregation chamber housing 115 via a web or spokes, not shown, which permit unobstructed movement of gas from the gas segregation chamber 110 into the adsorption gas capturing chamber 140 via the connecting passageway 125. Each of the cooling plates 105 comprise cryogenic fluid carrying passageways 122 through which cryogenic fluid is circulated from the feed line 172. The cryogenic fluid carrying passageways 122 ultimately loop back to the cryogenic fluid coolant reservoirs 160 via the return line 174. The feed line 172 and return line 174 are shielded by a feed and return line conduit 175. The cryogenic fluid is circulated through the cryogenic fluid carrying passageways 122 in the cooling plates 105 to bring the temperature of the cooling plates to below the condensation temperature of one or more target gasses in the internal segregation chamber environment 112. In the present embodiment, the cooling plates 105 are disk shaped but other embodiments contemplate other shapes, such as blades, rectangles, etc., without departing from the scope and spirit of the present invention. The gas segregation chamber 110 is considered a cryogenic 'roughing pump' to segregate out a majority of higher temperature condensing gasses from the lower temperature condensing gases before the lower temperature gasses migrate into the adsorption gas capturing chamber 140.

In practice, the heating element 150 heats the regolith 200 to a temperature above which will liberate gasses trapped in the regolith 200. The liberated gasses (of which there may be several different types, such as hydrogen, oxygen, helium, nitrogen, argon, etc.) enter the internal segregation chamber environment 112 via the inlet region 121 (when open) defined as either the area within the rim 120 or the area of the inlet aperture 192, whichever is smaller. In some embodiments, the inlet area within the rim 120 is the same as the area of the inlet aperture 192. The heating element 150 can diffuse energy to the surface of the regolith 200. The energy can be radiant energy, microwave energy, ultrasonic energy, conductive energy from a contact heater, or a laser that sweeps over an area under the area within the rim 120, just to name several non-limiting examples. In this embodiment a filter 130 interposed between the rim 120 and the cooling plates 105 prevents or at the least greatly reduces any dust from entering the internal segregation chamber environment 112 without blocking any gases.

With continued reference to the cooling plates 105, certain embodiments envision the cooling plates 105 being maintained at a temperature that is cold enough to condense out all gasses except for helium. In this case, liquid helium is circulated through the cooling plates 105 to maintain a temperature of the cooling plates 105 slightly above the condensation temperature of helium. In this way, helium is segregated from the other gases and will migrate through the connecting passageway 125 and into the adsorption gas capturing chamber 140, assuming the upper gate valve 126 is open. Meanwhile, the cooling plates 105 will, condensed water, oxygen, nitrogen, hydrogen, etc. hence the roughing pump portion of the gas collection arrangement 100. The valve 126 can be closed and the adsorption gas capturing chamber 140 can be separated at separation junction 128 for processing the contents of each chamber 110 and 140 remotely or on-site.

Certain other embodiments envision multiple different kinds of cryogenic fluid at different temperatures either made to flow through the cooling plates 105 successively to provide a successively colder internal segregation chamber environment 112 as discussed above. For example, liquid nitrogen can be made to flow through the cooling plates 105 first, followed by liquid oxygen, then liquid hydrogen and lastly followed by liquid helium. Another embodiment envisions the bottom two cooling plates 105 being maintained at a temperature that condenses water, the middle two cooling plates 105 being held at a temperature to condense oxygen and the upper two cooling plates 105 being held at a temperature that condenses hydrogen. This can be accomplished with multiple fluid cryogens or a single cryogen with different geometries of the cryogenic fluid carrying passageways 122 in each set of cooling plates 105 or optionally electric heaters embedded in the cooling plates 105 for temperature control, just to name several examples. The condensate on the cooling plates 105 can be collected and processed for later use. The heaters in the cooling plates 105 can further be used to heat the cooling plates 105 to a temperature the liberates the condensed gas from the plate surfaces for further processing.

Figure 2B:
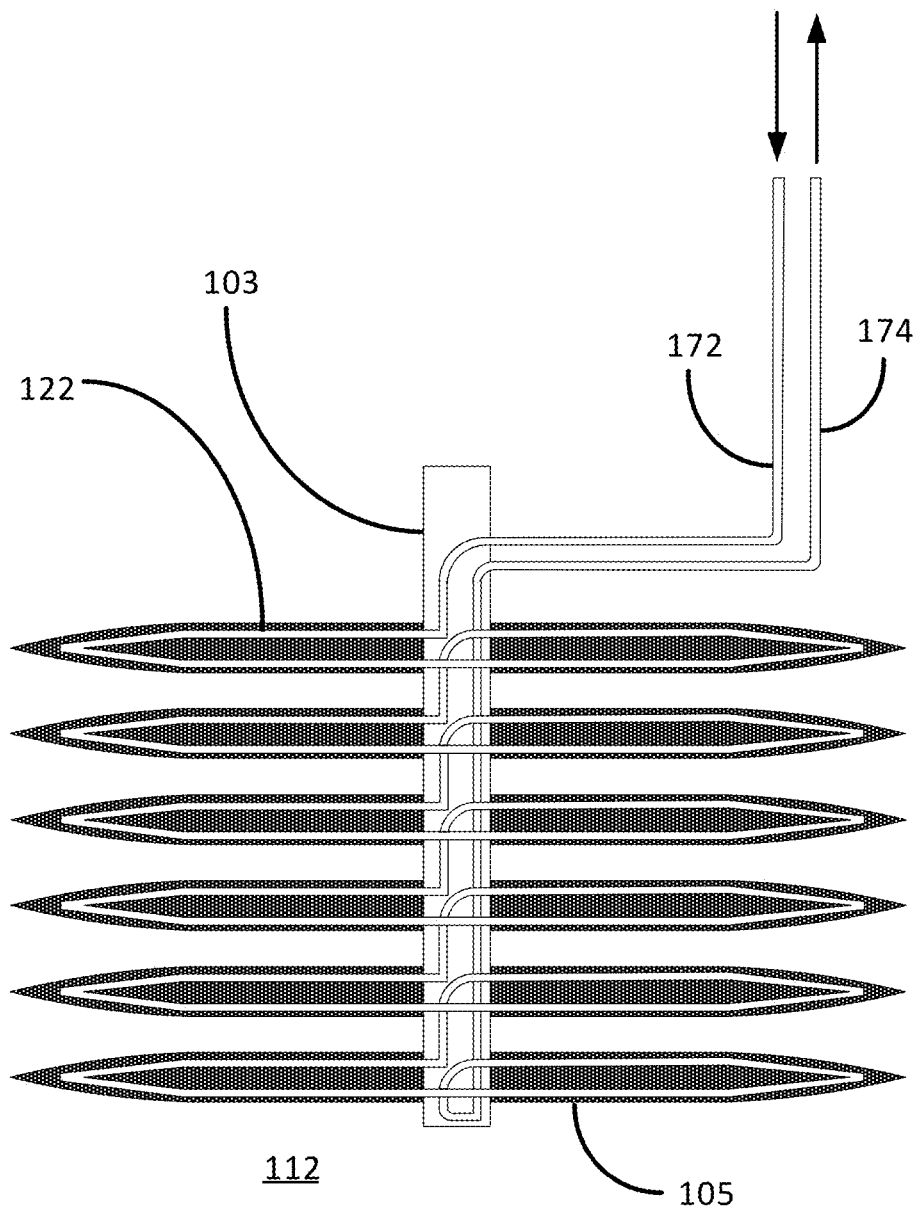
FIG. 2B is a line drawing of a higher resolution cross-section line drawing of the cooling plates consistent with embodiments of the present invention.

FIG. 2B is a higher resolution cross-section line drawing of the cooling plates 105 consistent with embodiments of the present invention. As shown, there is a downward arrow indicating the direction of cryogenic fluid flow in the feed line 172. The feed line 172 connects into each cooling plate 105 via the cryogenic fluid carrying passageways 122. In the present embodiment, the cryogenic fluid carrying passageways 122 in each cooling plate 105 connect to one another through the stem 103. The cryogenic fluid carrying passageway 122 in the bottom cooling plate 105 connects to the return line 174 in the stem 103 where it can flow (be pumped) back into the reservoir tank 160, shown by the up facing arrow.

Figure 3:
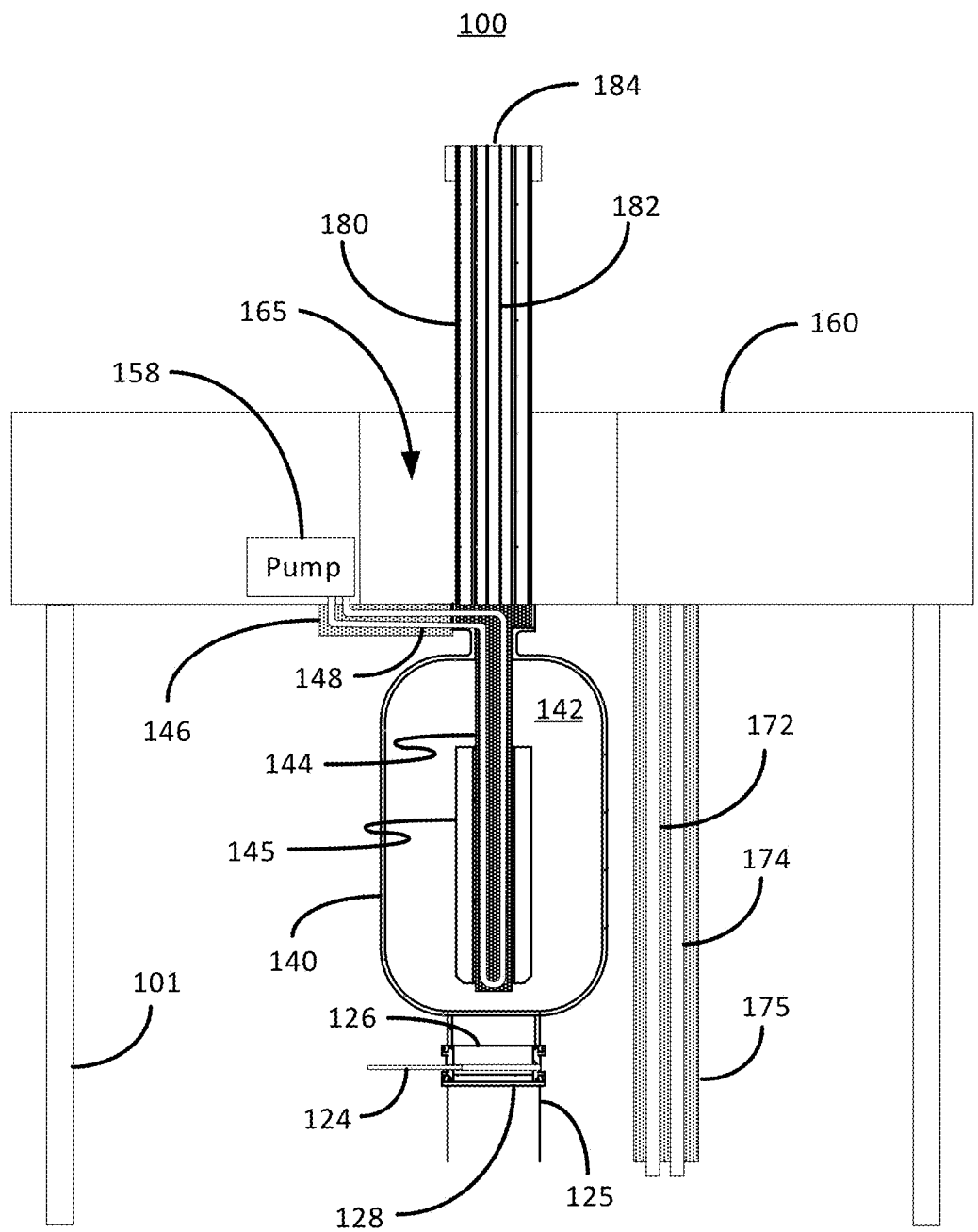
FIG. 3 is a higher resolution cross-section line drawing of the adsorption gas capturing chamber and cryogenic liquid coolant reservoir consistent with embodiments of the present invention.

FIG. 3 is a higher resolution cross-section line drawing of the adsorption gas capturing chamber 140 and cryogenic liquid coolant reservoir 160 consistent with embodiments of the present invention. As shown, a pump 158 disposed in the reservoir 160 is configured to circulate cryogenic liquid coolant through the upper chamber cryogen feed and return lines 148 and in one embodiment the lower chamber cryogen feed line 172 and return line 174. Other embodiments envision a separate pump circulating cryogenic liquid coolant through the lower chamber cryogen feed line 172 and return line 174. The adsorption gas capturing chamber 140 comprises a carbon adsorber 145 that is in contact with the upper chamber heat sink 144. The carbon adsorber 145 is cooled through conduction while the heat sink 144 is being cooled by the cryogen circulating through the upper chamber cryogen feed and return lines 148. In operation, the adsorption gas capturing chamber 140 is envisioned to mostly contain helium gas (as the segregated, targeted gas) since the other gasses liberated from the regolith 200 are mostly condensed in the gas segregation chamber 110. The helium gas contains a concentration of both He-3 and He-4 of which become trapped in the carbon adsorber 145. Because He-3 condenses at around 3° K, the carbon adsorber 145 is kept below that temperature to help retain He-3 and He-4.

The contents of the carbon adsorber 145, such as He-3 and He-4 from the example above, can be harvested by closing the gate valve 126, separating the adsorption gas capturing chamber 140 from the connecting passageway 125 at the separation junction 128, and removing the adsorption gas capturing chamber 140 through the access port 165 in the reservoir 160. Once removed, the adsorption gas capturing chamber 140 can be replaced with a new or ready to use adsorption gas capturing chamber 140. The adsorption gas capturing chamber 140 that has been collecting gas can be processed in a processing facility equipped to harvest or otherwise extract the gas captured in the adsorption gas capturing chamber 140 and the carbon adsorber 145. Optionally, the gas captured in the adsorption gas capturing chamber 140 and the carbon adsorber 145 can be extracted without removing the adsorption gas capturing chamber 140 via the access arm duct 182 extending through the adsorber access arm 180 by connecting an extractor at the access channel 184 at the top of the adsorber access arm 180. In yet another harvesting option, the carbon adsorber 145 is envisioned to be a cartridge that is removable from the adsorption gas capturing chamber 140 and replaceable with a new or ready to use cartridge.

Figure 4:
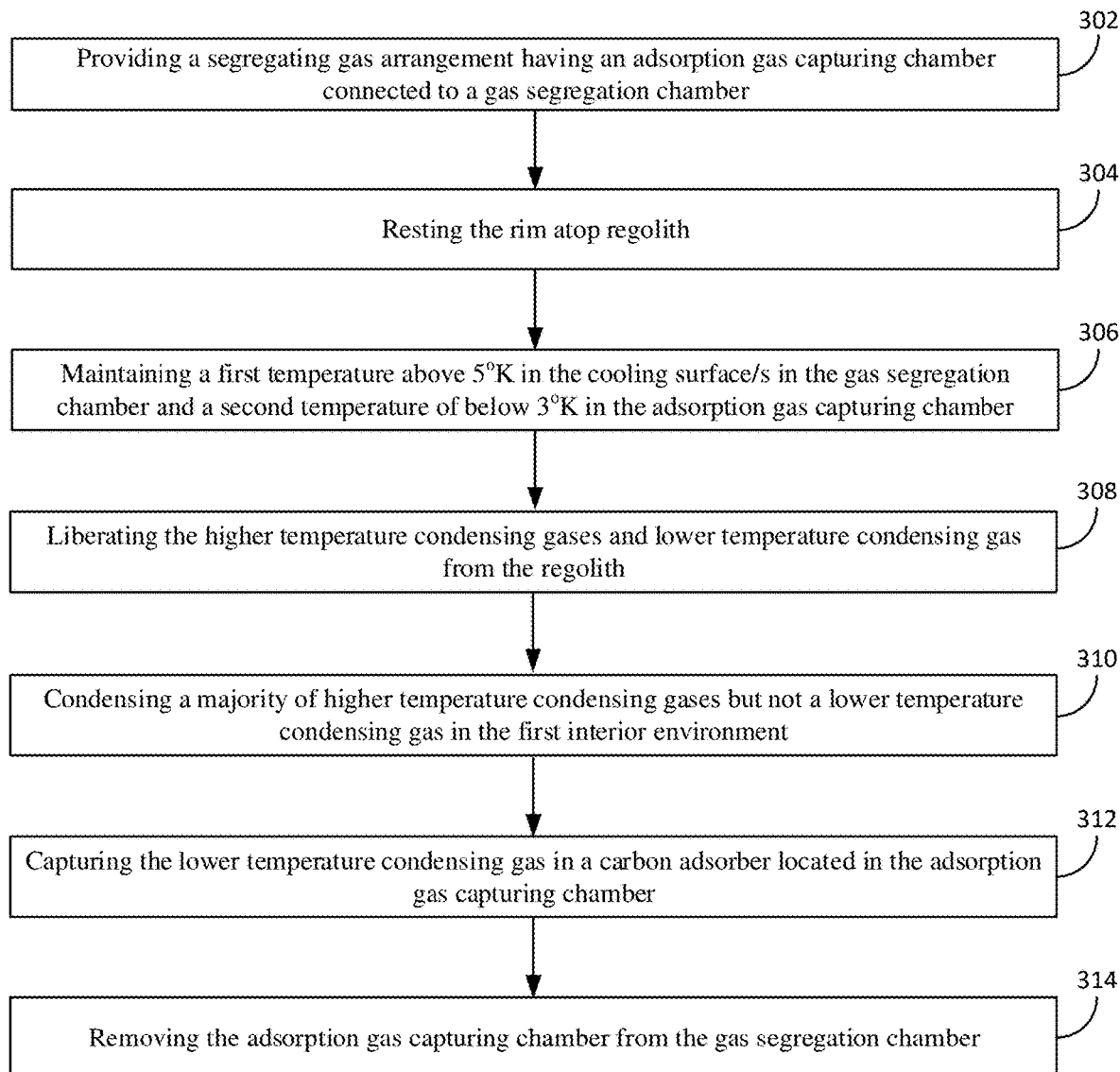
FIG. 4 is a block diagram describing method steps of using the segregating gas arrangement consistent with embodiments of the present invention.

FIG. 4 is a block diagram describing method steps of using the segregating gas arrangement 100 consistent with embodiments of the present invention. FIG. 4 is intended to be seen in view of the preceding figures with the callout numbers corresponding to the elements referred to therein. Step 302 refers to the segregating gas arrangement 100 as described above. Though the adsorption gas capturing chamber 140 is shown connected to the top portion of the gas segregation chamber 110, the adsorption gas capturing chamber 140 can be connected elsewhere. Certain other embodiments envision a single gas segregation chamber 110 (no separate adsorption gas capturing chamber 140) with the carbon adsorber 145 therein using potentially separate temperatures at different times to capture higher condensing temperature gasses then lower condensing temperature gas/es as described herein.

Step 204 is a step for locating the segregating gas arrangement 100 to a spot/location on the Moon or some other extraterrestrial body and resting the rim 120 of the gas segregation chamber 110 atop regolith 200. The positioning could be accomplished with a rover, manually, by a hovering device, or simply by deploying the segregating gas arrangement 100 from an orbiting or hovering craft.

Once deployed with the rim 120 resting on the regolith 200, as shown in step 306, the cooling plates 105 in the gas segregation chamber 110 are brought down to a temperature at or above 5° K, which can be accomplished by circulating liquid helium through channels 122 in the cooling plates 105. The cooling plates 105 are one embodiment of a cooling surface, which could be one or more screens, blades, channels, or some other surface that can be chilled as understood by those skilled in the art. 5° K is the temperature that all higher condensing temperature gasses other than helium will condense, which will essentially segregate or otherwise rough the higher temperature condensing gasses out in the gas segregation chamber 110. This process isolates helium gas (He-3 and He-4) to migrate into the adsorption gas capturing chamber 140 where it can be adsorbed by a carbon adsorber 145 maintained at below 3° K, which is a temperature that helium condenses. In order to accomplish these low temperatures, the liquid helium supplied by the reservoir 160 can be pressurized and further cooled. This process can be adjusted to different temperatures to target specific gasses having a higher condensing temperature than helium, such as targeting hydrogen or something else while roughing out even higher condensing temperature gasses.

As presented in step 308, the gas to be captured within the segregating gas arrangement 100 is liberated from the regolith 200 under the rim 120 via a heater 150 that heats up the regolith 200 to temperatures that may exceed 800° K. The liberated gas enters the interior environment 112 of the gas segregation chamber 110 through an opening (inlet region) 121 in the rim 120. In certain embodiments, the inlet region/opening 121 can be shut via a gate valve 190 to isolate at least the first interior environment 112. When the gate valve 190 is closed, the gases trapped in the gas segregation chamber 110 can be contained for further processing without simply escaping back through the inlet region/opening 121 and into the exterior environment 102.

With the different gasses in the segregating gas arrangement 100, a majority of the higher temperature condensing gases condense on the cooling plates 105 (step 310) preserving the lower condensing gases, such as helium, to condense in the carbon adsorber 145 (step 312). The carbon adsorber 145 and helium can be isolated from the gas segregation chamber 110 by closing the upper gate valve 126. In this way the carbon adsorber 145 can be removed from the adsorption gas capturing chamber 140 for further processing. Optionally, the adsorption gas capturing chamber 140 can be separated from and entirely removed from the segregating gas arrangement 100 at a junction between the gas segregation chamber 110 and the adsorption gas capturing chamber 140 (step 314). Certain other embodiments envision a mobile gas collector (not shown) going to the segregating gas arrangement 100 and pulling the accumulated helium gas from the adsorption gas capturing chamber 140 via an access arm duct 182 in the adsorber access arm 180 that extends from the adsorption gas capturing chamber 140. In another embodiment, the adsorption gas capturing chamber 140 can be heated to liberate the trapped helium gas in the carbon adsorber 145 when pulling the helium gas via the adsorber access arm 180. A similar technique can be used with the gas segregation chamber 110 to collect the higher condensing temperature gases trapped therein.

Another embodiment of the present invention envisions separating multiple gas species contained within the upper chamber 140 using techniques like that of a mass spectrometer. A mass spectrometer is an apparatus for separating isotopes, molecules, and molecular fragments according to mass. A sample to be analyzed in a mass spectrometer is vaporized and ionized, and the ions are accelerated in an electric field and deflected by a magnetic field into a curved trajectory that gives a distinctive mass spectrum. Mass spectrometry (MS) is an analytical technique that is used to measure the mass-to-charge ratio of ions. In a typical MS procedure, a sample, which may be solid, liquid, or gaseous, is ionized, for example by bombarding it with a beam of electrons. This may cause some of the samples molecules to break up into positively charged fragments or simply become positively charged without fragmenting. These ions (fragments) are then separated according to their mass-to-charge ratio, for example by accelerating them and subjecting them to an electric or magnetic field: ions of the same mass-to-charge ratio will undergo the same amount of deflection. The ions are detected by a mechanism capable of detecting charged particles, such as an electron multiplier. Results are displayed as spectra of the signal intensity of detected ions as a function of the mass-to-charge ratio. The atoms or molecules in the sample can be identified by correlating known masses (e.g. an entire molecule) to the identified masses or through a characteristic fragmentation pattern.

Hence, certain other embodiments of the present invention envision a gas separation arrangement for separating and containing various types of gas from a collection chamber based on their different atomic masses. The chamber is connected to an ion diverter via a valve that when open permits the various types of gas to migrate from the collection chamber to an ionizer where the gas is ionized. The ionized gas is accelerated through an ion accelerator and dispensed into an ion deflector. The ion deflector comprises a magnetic field within a channel defined by a pair of split-pole magnets. The trajectory of the ions is based on the mass of the ions, which separates the ions. Multiple collectors are positioned at different locations on an exit side of the ion deflector to receive the different ions traveling along their respective trajectories.

Another aspect of the present invention contemplates a particle filtration arrangement that prevents regolith dust from entering the gas segregation region 112, where the cooling plates 105 are located. The particle filtration arrangement is configured and arranged to redirect charged regolith particles 200B causing them to electrostatically adhere to electrically conductive plates positioned between the gas segregation region 112 and the gas segregation chamber rim 120.

Inventive aspects in the following description introduces a particle filtration arrangement designed to prevent harmful regolith dust from contaminating critical components within a gas segregation region, particularly the cooling plates used for condensing gases in extraterrestrial environments. This system integrates an electrostatic filter arrangement and a final-stage ULPA mesh filter to redirect and capture both charged and neutral lunar dust particles. Utilizing an ionizing screen made of triangular apex wires or optionally a horizontal ionizing bar, the invention creates a dense electron curtain through field emission, effectively converting neutral particles into negatively charged ones. These charged particles are then electrostatically drawn to paired conductive plates, which may be oil-coated to enhance particle adhesion. The architecture ensures that only gases, and not particles, pass through to the gas segregation region, thereby preserving the purity and thermal efficiency of the gas segregation region and system as a whole. Overall, the system significantly reduces equipment fouling, enhances operational lifespan, and maintains high-performance gas separation, which is critical for extraterrestrial resource extraction and habitat support.

Figure 5A:
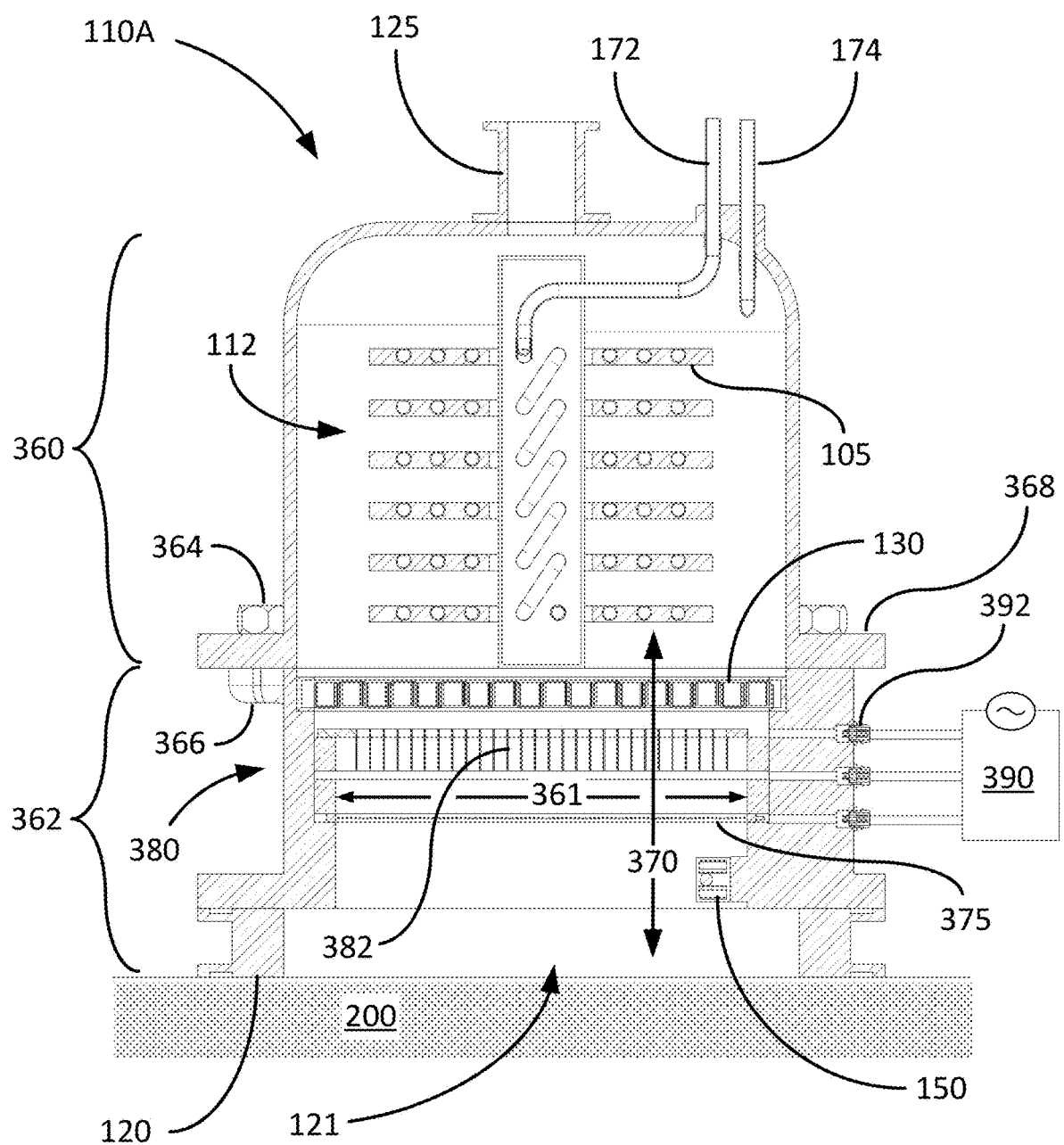
FIGS. 5A-5D are line drawings that illustrate various views of a redirecting arrangement consistent with embodiments of the present invention.

To this point, FIGS. 5A-5D are line drawings that illustrate various views of a redirecting arrangement consistent with embodiments of the present invention. FIGS. 5A-5D are described in view of one another. FIG. 5A depicts a cross-sectional view of a gas segregation chamber 110A, which is similar to the chamber 110 shown in FIG. 1A but includes an electrostatic particle filter in the form of a gas redirection arrangement 380. This chamber comprises an upper housing 360 bolted to a lower dust mitigation housing 362 via bolts 364 that clamp together the upper and lower flanges 368 and 366. The upper housing 360 includes components previously described such as cooling plates 105, helium feed and return lines 172 and 174, and the connecting passageway 125 to the upper chamber 140 (shown in FIG. 1A).

Figure 5B:
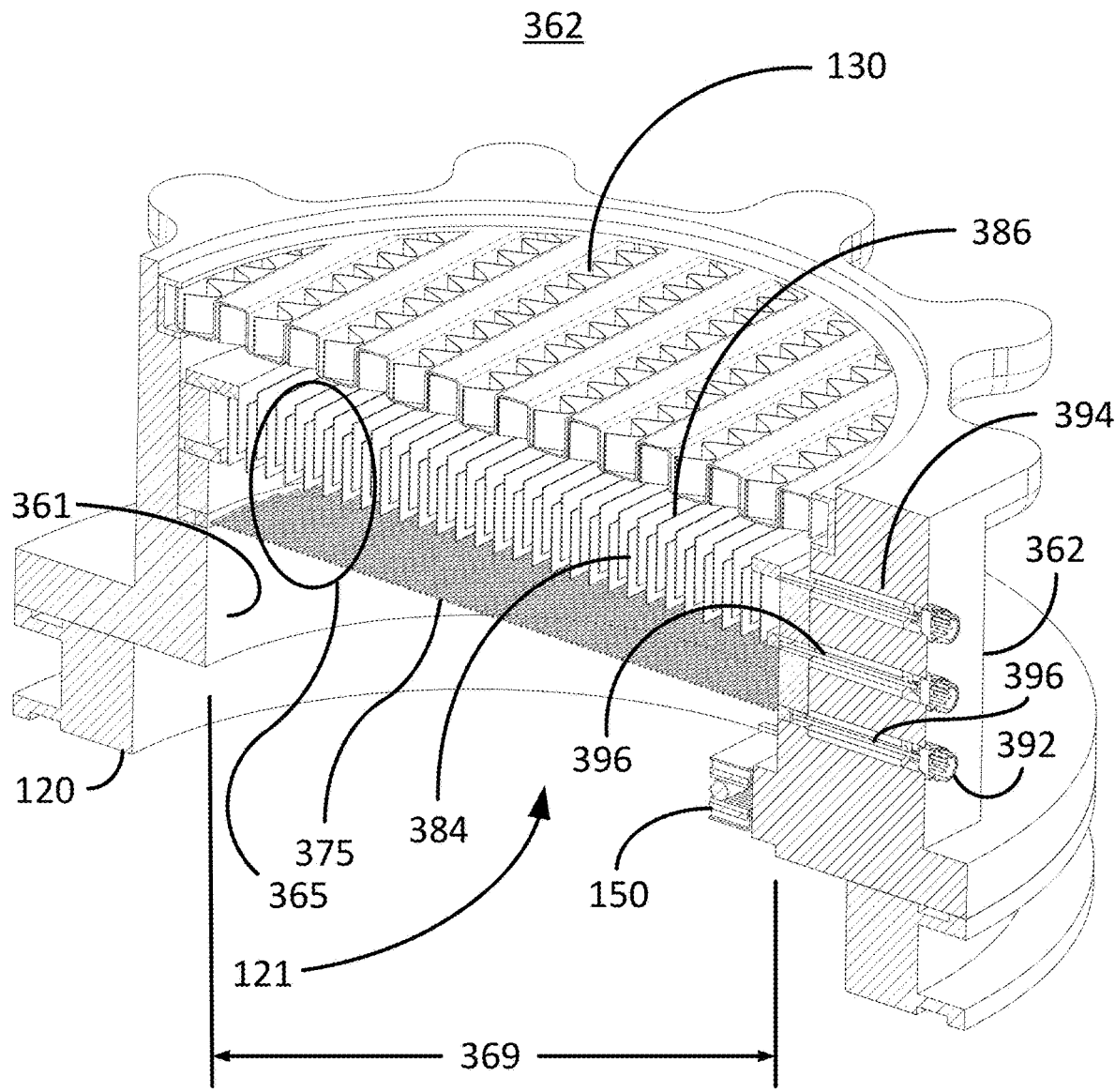
Figure 5C:
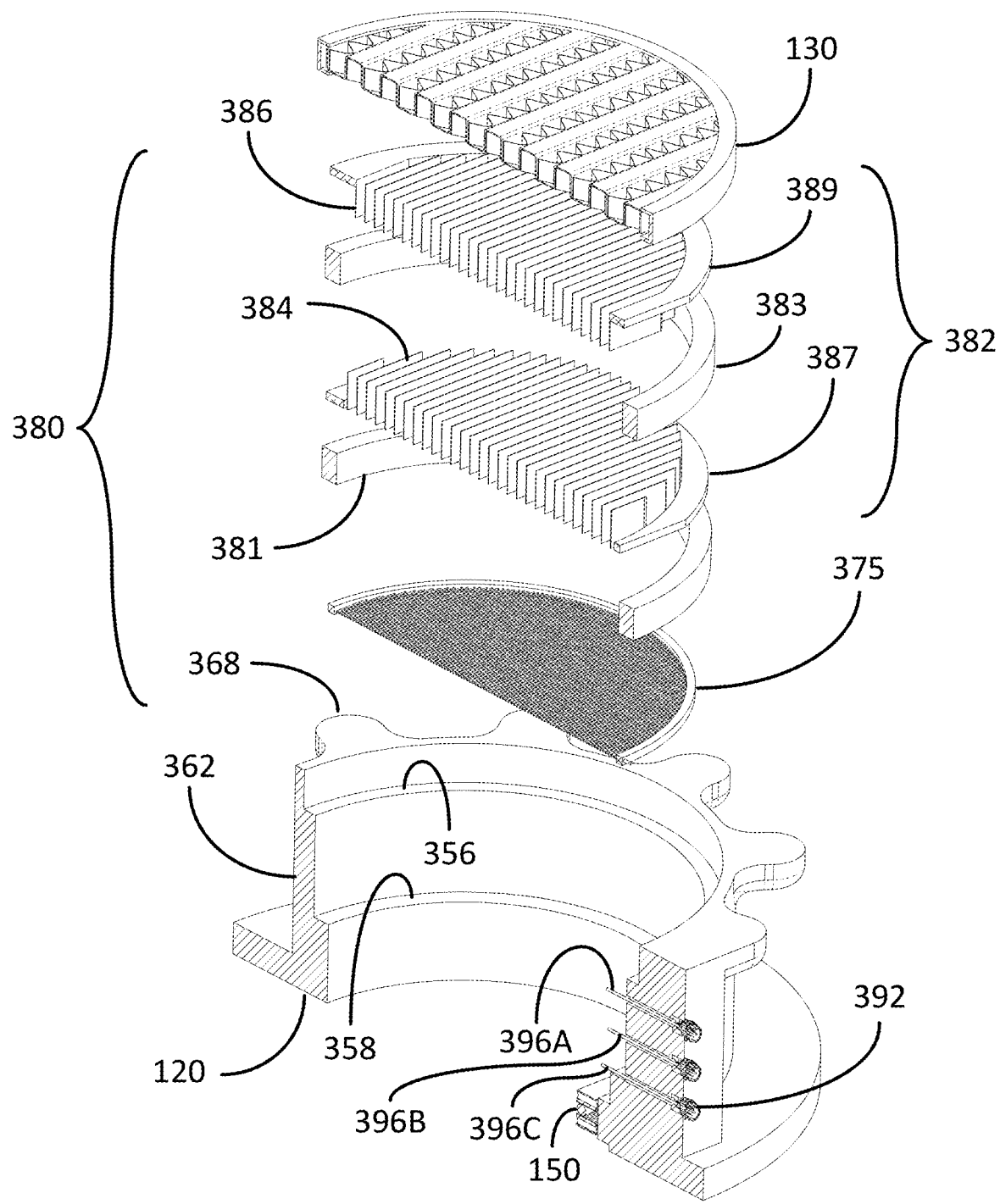

As illustrated in FIGS. 5B and 5C, the lower dust mitigation chamber housing 362 includes a heater 150 configured and arranged to liberate gas from regolith 200, an electrostatic filter arrangement 380 that is configured to attract charged regolith particles 200B, and a final-stage filter mesh 130, such as an ULPA filter, that is configured to remove any remaining dust particles 200A. The electrostatic filter arrangement 380 includes an ionizing screen 375 and multiple paired particle retention surfaces 382 that electrostatically attract charged dust/regolith particles 200B when energized. The ionizing screen 375 is positioned between the rim 120 and the particle retention surfaces 382, which in turn are located below the final-stage filter mesh 130. Both the ionizing screen 375 and the particle retention surfaces 382 are powered via electrical connectors 392 and power lines 396A and 396B that are connected to a power supply 390. The electrostatic filter arrangement 380 and final-stage mesh 130 obstruct the internal passageway 361 to prevent particle ingress. The ionizing screen 375 functions by converting uncharged or low-charged regolith particles 200A into negatively charged particles 200B, which are then attracted to the conductive collection plates 382.

Figure 5D:
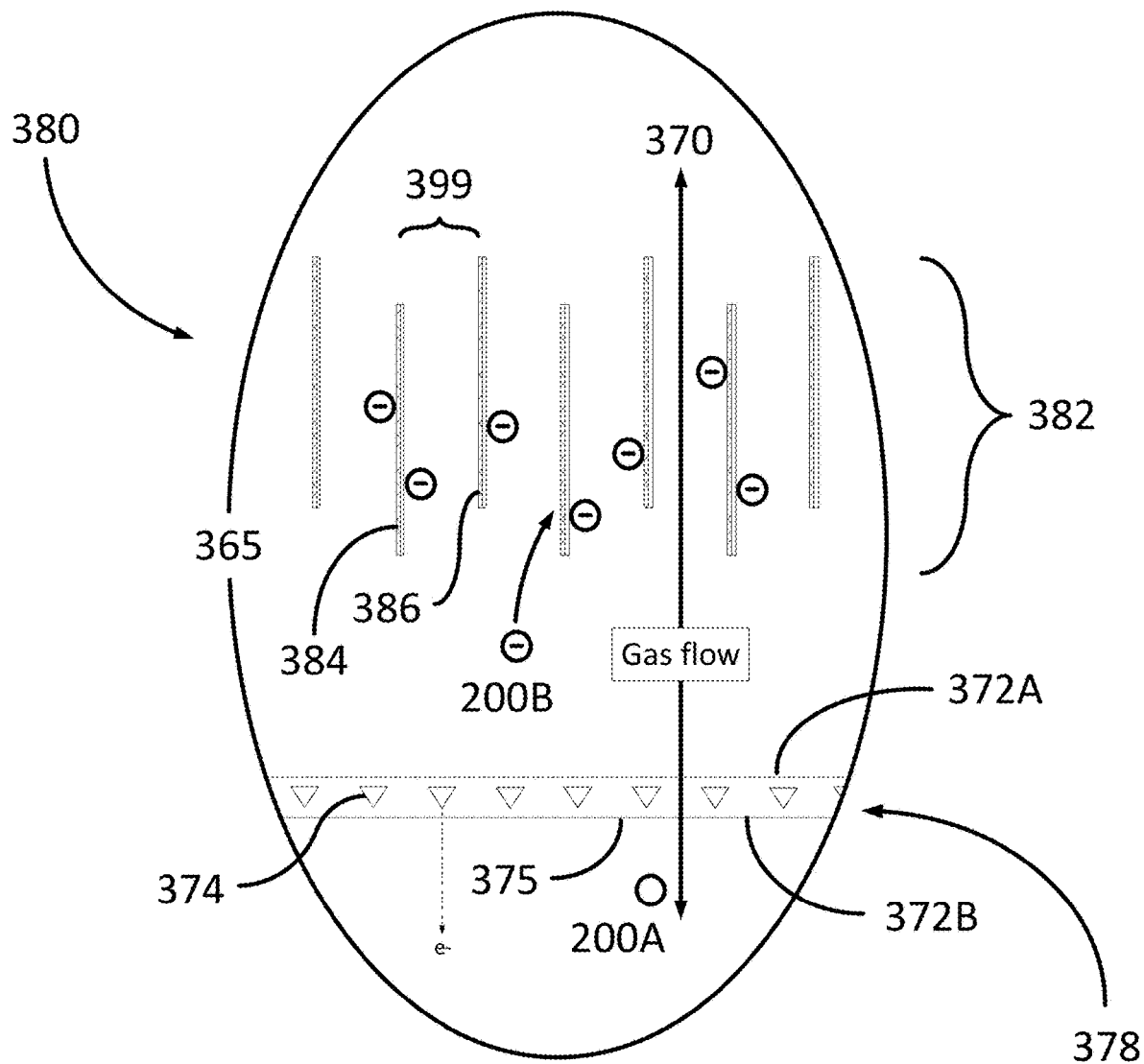
Figure 5E:
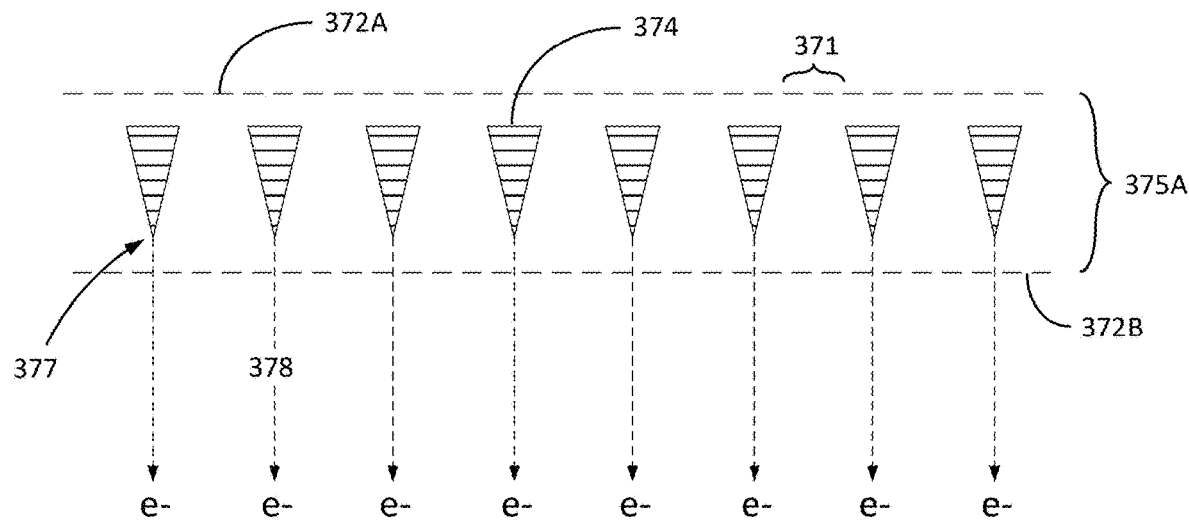
FIGS. 5E and 5F present cross-sectional views of different embodiments of the wires incorporated in the ionizing screen consistent with embodiments of the present invention.
Figure 5F:
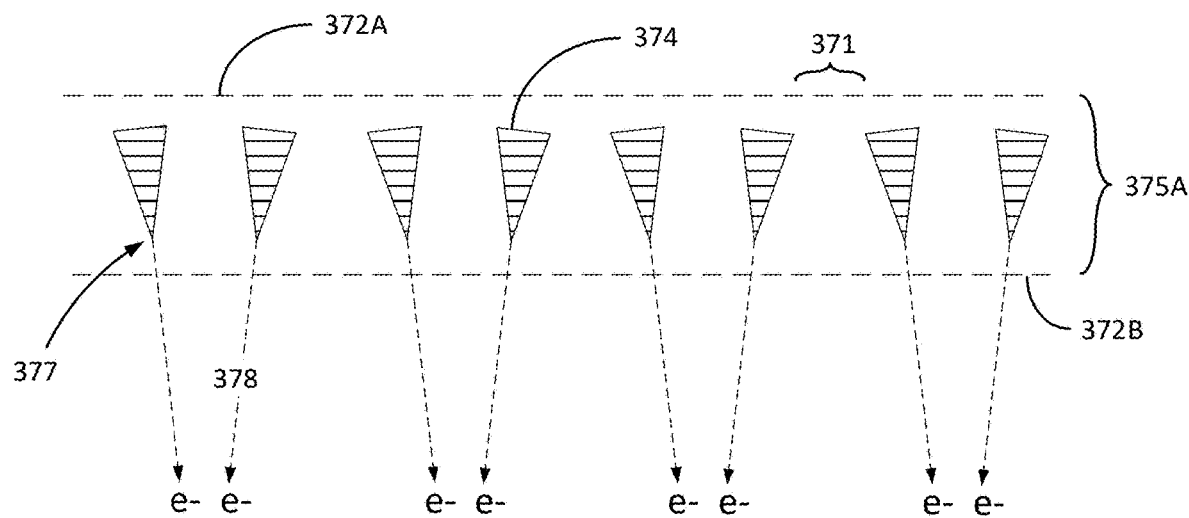
Figure 5G:
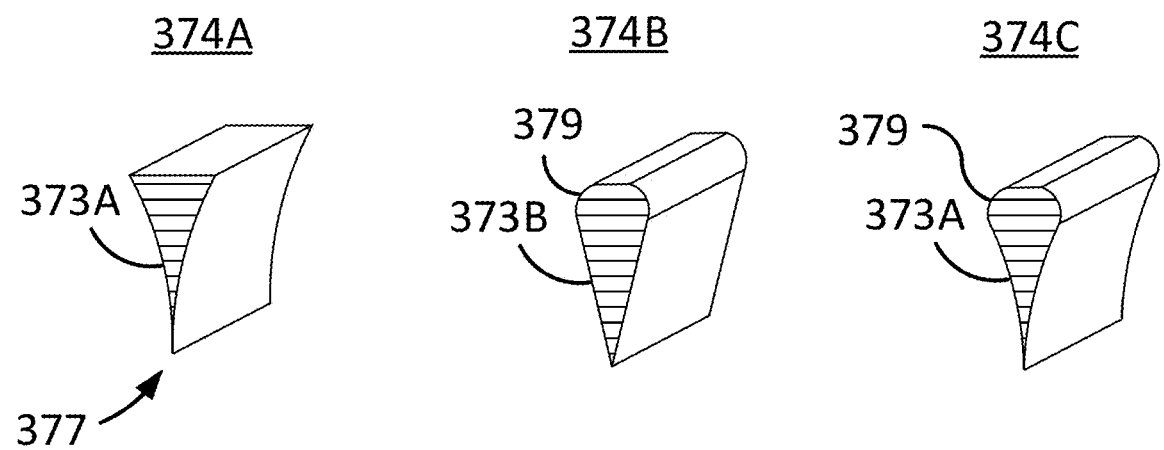
FIG. 5G illustrates three exemplary cross-sectional profiles of the triangular electron-emitting wires consistent with embodiments of the present invention.

As shown in FIGS. 5E-5G, the ionizing screen operates via electron field emission from equilateral triangular wires 374 in vacuum conditions (e.g., lunar surface), using quantum tunneling of electrons from the sharp apexes 377 under a strong electric field. These apexes 377 create a high field enhancement factor, reducing the work function and enabling efficient emission even at moderate voltages. The vacuum reduces electron scattering, allowing for a stable, high-density electron beam 378 that negatively charges the regolith particles 200A. As used herein, an apex of a wire or bar is synonymous with a ridgeline, such as one that is similar to a ridgeline on a roof.

In one embodiment, the electric field strength is in the range of 1-5 V/nm. The triangular wire tips 377 may have radii between 5-50 nm, energized by a DC voltage in the range of 150-15 kV from the power supply 390. The ionizing screen 375 comprises conductive triangular wires 374 (e.g., copper or Inconel), arranged in a planar array, which in this embodiment are pointing downwards. Inconel may be favored due to its resilience to extreme thermal cycles typical of extraterrestrial environments. The conductive wires 374 may and may be drawn or extruded with the triangular cross-section that in some embodiments is an isometric triangle, a needle point profiled 374A or a triangular shaped bar having a profile with curved upper corners 374B or some combination thereof shown in the profile 374C, as shown in FIG. 5G. The ionizing screen 375 is arranged with each wire 374 physically separated and electrically isolated from neighboring wires 374, which provides an inter-wire spacing 371 to allow passage of charged particles 200B. In one embodiment, the wires are powered with a DC voltage (e.g., 150-5000V), though other voltages are also contemplated.

As neutral or low charged particles 200A pass through the electron curtain 378, they acquire a negative charge, becoming negatively charged particles 200B, which, if the particles 200B have sufficient momentum to overcome the Moon's gravity, will migrate toward and adhere to the electrostatic collection plates 382, as shown in FIG. 5D. In this embodiment, the electrostatic collection plates 382 comprise paired vertical metal plates 384 and 386, which are parallel, held at a potential difference (e.g., 5-15 kV DC), creating a non-uniform electric field that facilitates the lateral redirection (due to the electrostatic attraction) and capture of the negatively charged particles 200B. In some embodiments, the paired vertical metal plates 384 and 386 are coated in oil to improve particle retention.

FIG. 5B presents an isometric view of the lower dust mitigation chamber housing 362, illustrating the spatial and functional relationship between key components: the final stage filter mesh 130, the electrostatic collection plates 382, the ionizing screen arrangement 375, and the power leads 396 with their corresponding power connectors 392. In one embodiment, the higher voltage staggered plates 386 are positively charged through the upper power line 396, while the lower voltage staggered plates 384 are either grounded or held at a voltage lower than the higher voltage plates 386 using the middle power line 396B. Additional structural details in the encircled region 365 are further expanded upon in FIG. 5D. For reference, the heating element 150 is positioned between the ionizing screen arrangement 375 and the rim 120, with the purpose of heating the regolith 200 within the inlet region 121 defined between the rim 120.

FIG. 5C provides an exploded view of FIG. 5B, showing the components in a disassembled configuration to clarify their relative positions and assembly order. From top to bottom, the final stage filter mesh 130 serves as the last defense in particle filtration, ensuring that the gas segregation region 112 remains free from particles 200A/200B, thereby enhancing the condensation efficiency of the target gasses on the cooling plates 105. The final stage filter mesh 130 is designed to be gas-permeable, enabling the transfer of gas from the lower dust mitigation chamber housing 362 to the gas segregation region 112. Within the electrostatic filter arrangement 380, the higher voltage plates 386 are powered by an upper bus bar 389, while the lower voltage plates 384 are maintained at a lower potential or grounded via a lower bus bar 387. An upper electrical insulation ring 383 separates the bus bars 389 and 387 to maintain electrical isolation. Similarly, the ionizing screen arrangement 375 is electrically separated from the electrostatic collection plates 382 by a lower electrical insulation ring 381. The lower dust mitigation chamber housing 362 includes an upper shelf 356 to support the final stage filter mesh 130, and a lower shelf 358 to support the ionizing screen arrangement 375 and other associated components of the electrostatic filter arrangement 380. Additional supporting infrastructure, such as power connectors 392, electrical leads 396 running through conduits 394, the heating source 150, and the rim 120, are called out for reference.

FIG. 5D shows a detailed close-up of the electrostatic filter arrangement 380 as highlighted in the encircled region 365 of FIG. 5B. Illustrated by two-way arrow 370, gas is able to pass through both the electrostatic collection plates 382 and the ionizing screen arrangement 375, while charged regolith particles 200B are intercepted and adhere to the electrostatic collection/retention plates 382. Specifically, as neutral regolith dust particles 200A pass through the ionizing screen 375, they are bombarded by a curtain of electrons 378 emitted by the wires 374, which converts them into negatively charged particles 200B. These negatively charged particles 200B are then attracted to and adhere to the energized electrostatic collection plates 382. This process results in the efficient capture and removal of the charged regolith particles 200B. Meanwhile, any remaining upwardly migrating particles, not electrostatically captured, are intercepted by the final stage filter mesh 130, preventing further ingress into the gas segregation region 112. The electrostatic collection plates 382 are configured with a plurality of flow channels 399 that allow gas to continue passing through, hence allowing the gas segregation region 112 to be in gas communication with the regolith surface 200 but not particle communication. In the depicted embodiment, the lower voltage plates 384 are arranged in a staggered configuration relative to the higher voltage plates 386. However, alternative configurations may involve non-staggered arrangements or alternative geometries that otherwise serve the same electrostatic purpose.

FIGS. 5E and 5F present cross-sectional views of different embodiments of the wires 374 incorporated in the ionizing screen 375. As shown in FIG. 5E, electron curtains 378 are emitted downward from the triangular apexes 377 of the wires 374, targeting the regolith surface 200 below. In this embodiment, the triangular wires 374 are held between an upper protective mesh 372A and a lower protective mesh 372B, spaced apart by a clearance distance 375A to prevent physical contact. Certain alternative embodiments omit either or both protective meshes.

FIG. 5F shows an arrangement in which the triangular wire apexes 377 are oriented toward each other, allowing their respective electron curtains 378 to overlap. This overlapping pattern increases the likelihood that all regolith particles 200A are exposed to electrons, enhancing the uniformity and effectiveness of particle charging.

FIG. 5G illustrates three exemplary cross-sectional profiles of the triangular electron-emitting wires 374. The first, profile 374A, is a needle-point configuration with concave curved sidewalls 373A, which enhances the sharpness of the needle tip 377 for improved field emission. The second, profile 374B, consists of a triangular cross-section with curved upper corners 379 and straight sidewalls 373B, designed to focus electron emission toward the apex 377. The third profile, 374C, combines curved upper corners 379 with concave curved sidewalls 373A, offering a blended configuration that directs electrons efficiently to the needle tip 377. These geometries are designed to maximize electric field intensity and emission stability.

Another aspect of the present invention is a particle repelling screen integrated within an electrostatic and electromagnetic dust filtration system for extraterrestrial environments. Designed to protect gas segregation region from contamination by iron-rich regolith dust, the system employs a planar array of conductive wires energized with phase-shifted alternating current to generate a sweeping magnetic field. This field repels positively charged or polarizable particles before they reach downstream components. Neutral particles that pass through are negatively charged by an electron curtain generated via field emission from triangular apex wires or horizontal emitter bars. These charged particles are then electrostatically attracted to paired retention plates. A final-stage mesh filter captures residual dust, ensuring that only gas enters the gas segregation region. The system enhances gas purity, reduces fouling, and improves operation of cooling components in the gas segregation region, making it particularly well-suited for lunar resource processing.

Figure 5H:
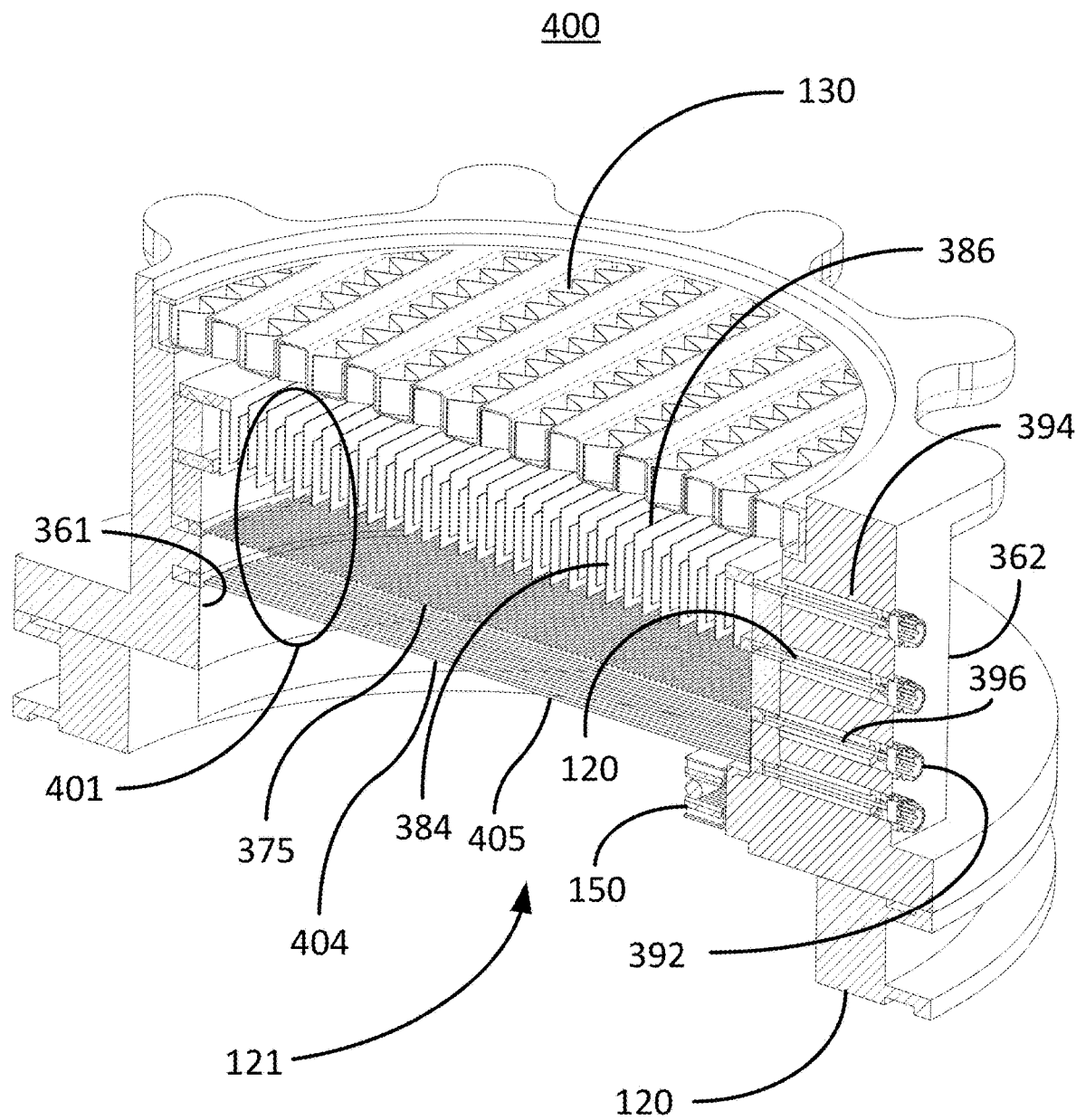
FIG. 5H depicts an alternative embodiment that includes a particle repelling screen integrated within an electrostatic and electromagnetic dust filtration system for extraterrestrial environments consistent with embodiments of the present invention.
Figure 5I:
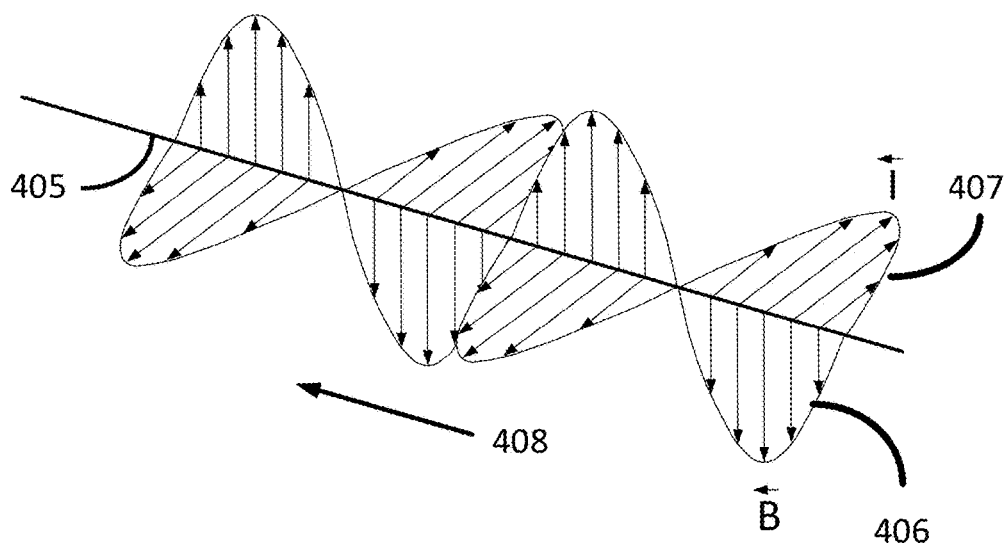
FIGS. 5I and 5J are line drawings that illustrate the behavior of the sweeping magnetic field created by the alternating current through the wires of the particle repelling screen consistent with embodiments of the present invention.
Figure 5J:
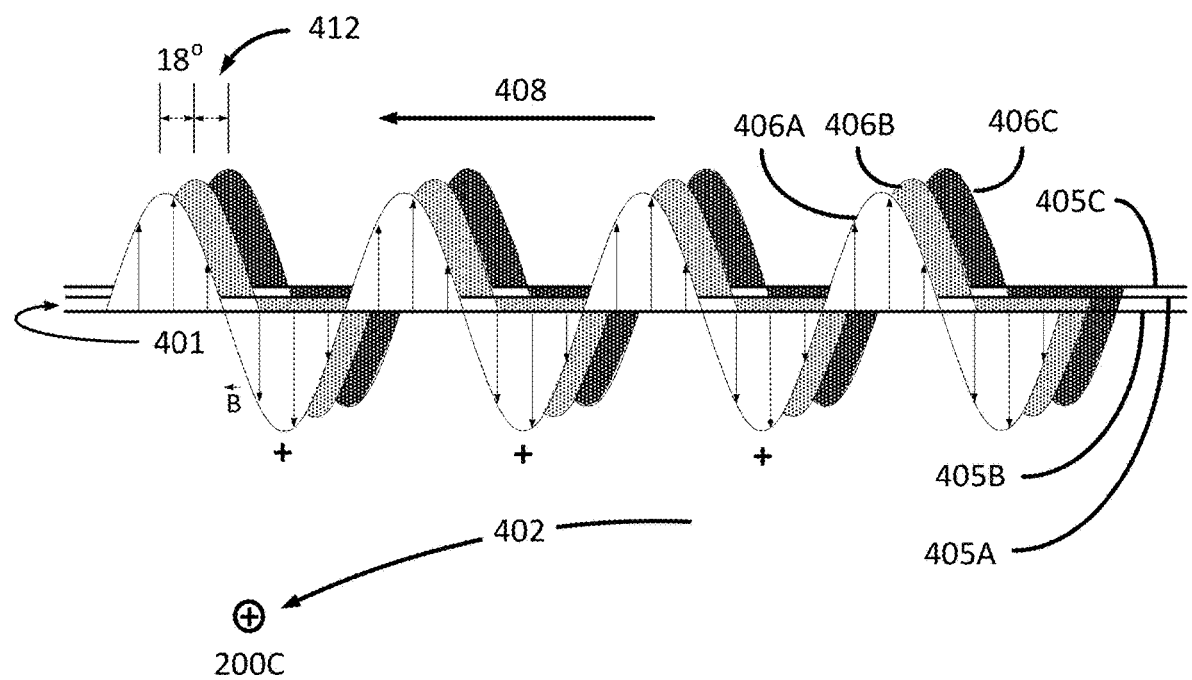
Figure 5K:
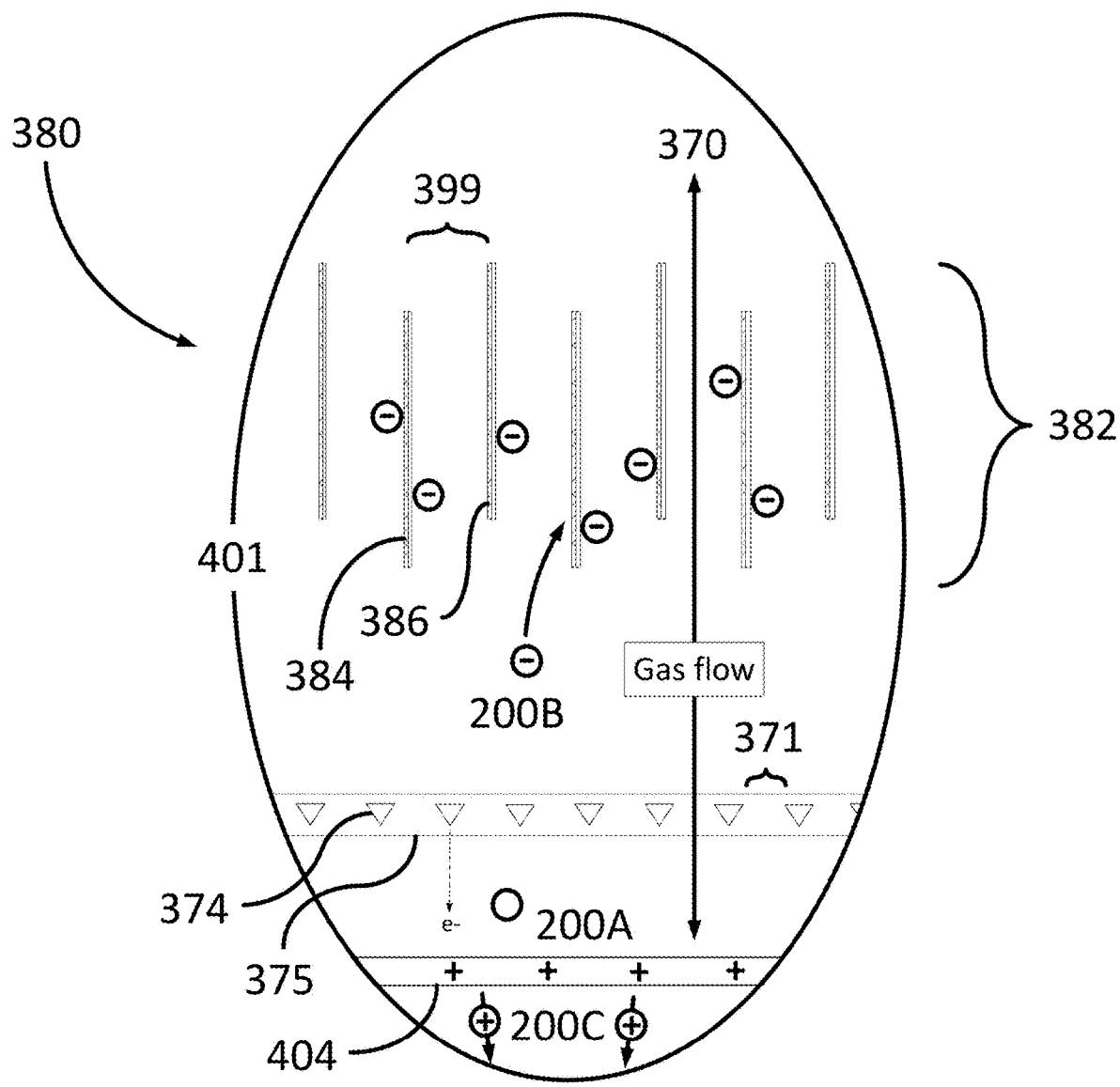
FIG. 5K graphically demonstrates how the particle repelling screen deflects positively charged iron-based regolith particles downward consistent with embodiments of the present invention.

FIG. 5H, in conjunction with FIGS. 5I-5K, depicts an alternative embodiment that includes a particle repelling screen 375 integrated within an electrostatic and electromagnetic dust filtration system for extraterrestrial environments, wherein iron-based regolith particles 200C are repelled prior to reaching the ionizing screen 375 through the use of a particle repelling screen 404. Lunar regolith 200 contains a significant amount of iron, resulting in a high concentration of positively biased particles 200C. The system illustrated in FIG. 5H, an integrated electromagnetic and electrostatic dust repelling system 400, builds on the components described in FIGS. 5A-5G and incorporates an additional iron-particle repelling screen 404. As shown, the screen 404 consists of conductive wires 405 with diameters ranging from 10 to 300 mils, made from materials such as steel, copper, Inconel, or other suitable conductors. Certain embodiments contemplate the conductive wires 405 being cylindrical while other embodiments contemplate the conductive wires 405 having non-cylindrical cross-sections to concentrate the magnetic field at their surfaces and enhance repulsive force efficiency.

The particle repelling screen 404 is specifically designed to repel positively charged particles 200C and is situated between the ionizing screen 375 and the rim 120, extending across the full diameter 369 of the internal passageway 361. The wires 405 comprising the screen are configured to carry high-frequency alternating current (AC) supplied by the power supply 390, which is tuned to deliver the necessary current magnitude and frequency to each wire 405. In one example embodiment, the wires 405 are approximately 10 µm in diameter, arranged in parallel, and spaced roughly 1 mm apart, though alternative sizes and spacings are feasible. The triangular wires 374 are arranged in a planar array, electrically isolated from one another via the particle passage space 371 to allow passage of negatively charged particles 200B.

In some embodiments, the particle repelling screen 404 is suspended about 25 mm above the regolith surface 200 and operated at a potential of +10 kV. The particle repelling screen 404 comprises a planar array of wires 405, each separated by particle passage space 401, enabling non-repelled particles with sufficient momentum to pass through. To generate the necessary electromagnetic field for repelling ferrous dust 200C, the screen is driven with a time-varying magnetic field (see FIG. 5I). This is accomplished by applying an AC current, e.g., 5 Amps at 50 kHz, through adjacent wires 405B and 405C, with a phase offset of approximately π/10 radians (18°) between each wire 405A-405C. The resulting magnetic wave induces eddy currents in ferric dust particles, creating magnetic repulsion forces consistent with Lenz's Law. In addition, dipole interactions generated by the non-uniform electric field influence neutral but polarizable particles (such as iron-based particles 200C). The power supply 390 is configured to deliver the appropriate frequency, amplitude, and phase offset either via digital/analog electronics or a built-in controller (not shown).

Neutral but polarizable particles are common in lunar regolith 200 due to dynamic environmental and mechanical charging. During lunar daytime, UV radiation ionizes surface dust, predominantly generating positive charges, while solar wind electrons and triboelectric effects, such as friction between rover wheels and the regolith, create negative charge accumulation in localized regions.

FIGS. 5I and 5J are line drawings that illustrate the behavior of the sweeping magnetic field created by the alternating current through the wires 405 of the particle repelling screen 404. FIG. 5I depicts the alternating current (I) 407 flowing through a wire 405 in the direction of arrow 408, with the resulting magnetic field (B) 406 moving relative to the wire.

FIG. 5J illustrates the phase shift 412 between the magnetic fields 406 produced by three adjacent wires: wire 405A (white), wire 405B (center, light gray), and wire 405C (dark gray). The magnetic field wave 406A generated by wire 405A is phase-shifted π/10 radians left of the neighboring wave 406B from wire 405B. Other phase shift angles are contemplated in addition to different frequencies, which could be as low as in the Hz range as opposed to the kHz range. Meanwhile, the wave 406C from wire 405C is phase-shifted to the right of wave 406B. This phase-shifted sweeping motion sweeps or otherwise displaces the iron-rich and other positively charged particles 200C laterally to the left (direction 408). Combined with the downward influence of lunar gravity, this causes the particles 200C to follow an arced path downward and away from the gas segregation region 112. Though FIG. 5J can include a constant, single alternating current frequency 407, other embodiments contemplate the alternating current (407) supplied to the conductive wires (405) varying in frequency across the array of conductive wires 405 to create a broadband magnetic field profile for increased iron-based or positively charged particle rejection effectiveness.

FIG. 5K, and its magnified oval 401 view from FIG. 5H, graphically demonstrate how the particle repelling screen 404 deflects positively charged iron-based regolith particles 200C downward, preventing them from infiltrating the area between the particle repelling screen 404 and the paired particle retention surfaces 382. Particles 200A not repelled and possessing sufficient momentum pass through the spacing 371 between wires 405, becoming negatively charged particles 200B upon exposure to the curtain of electrons 378 emitted by the ionizing wires 374. These negatively charged particles 200B are then attracted to and retained by the paired particle retention surfaces 382. Any remaining particles are intercepted by the final stage filter mesh 130, thereby ensuring that the internal segregation chamber environment 112 remains free of contaminants.

Figure 5L:
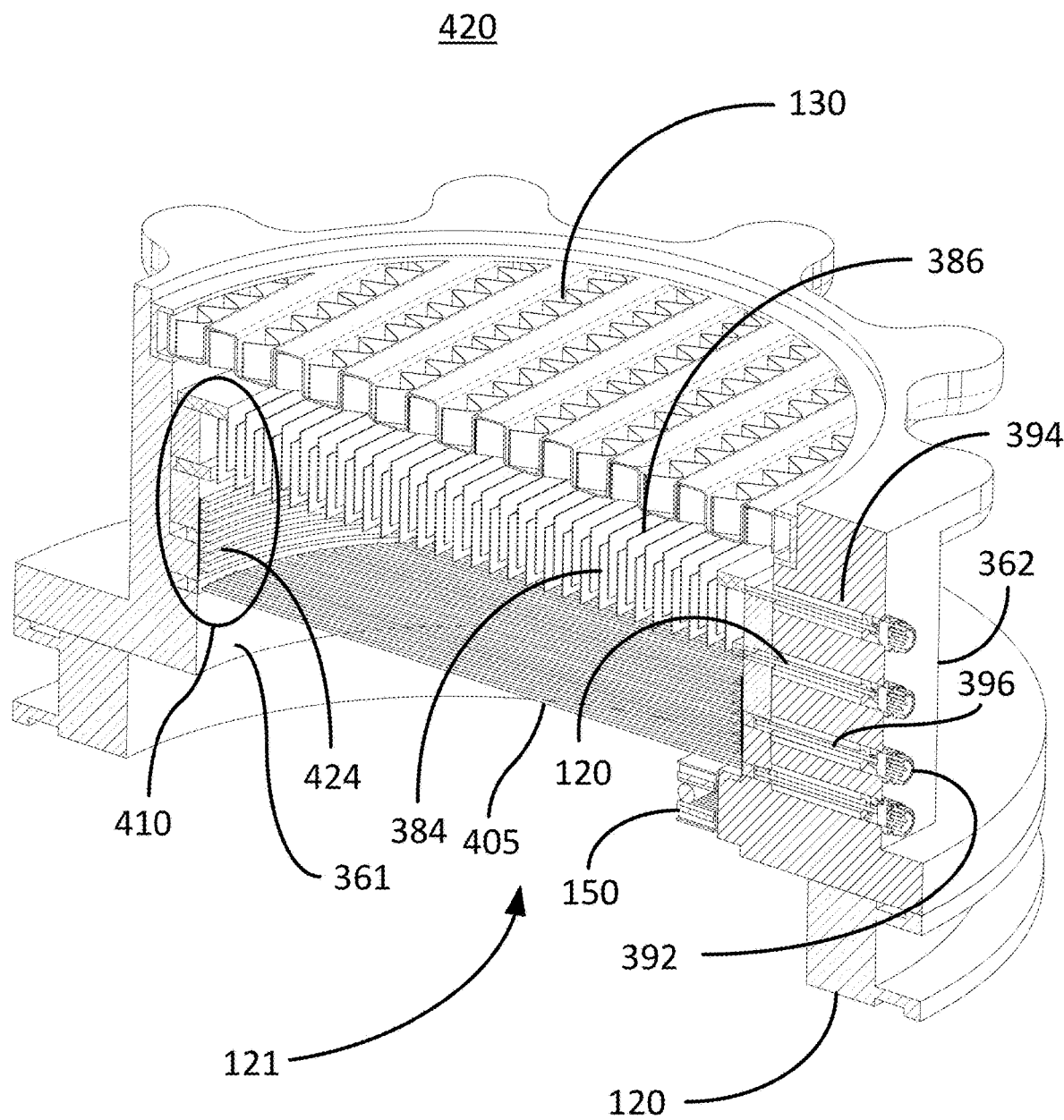
FIGS. 5L and 5M present yet another embodiment of an integrated electromagnetic and electrostatic dust repelling system consistent with embodiment of the present invention.
Figure 5M:
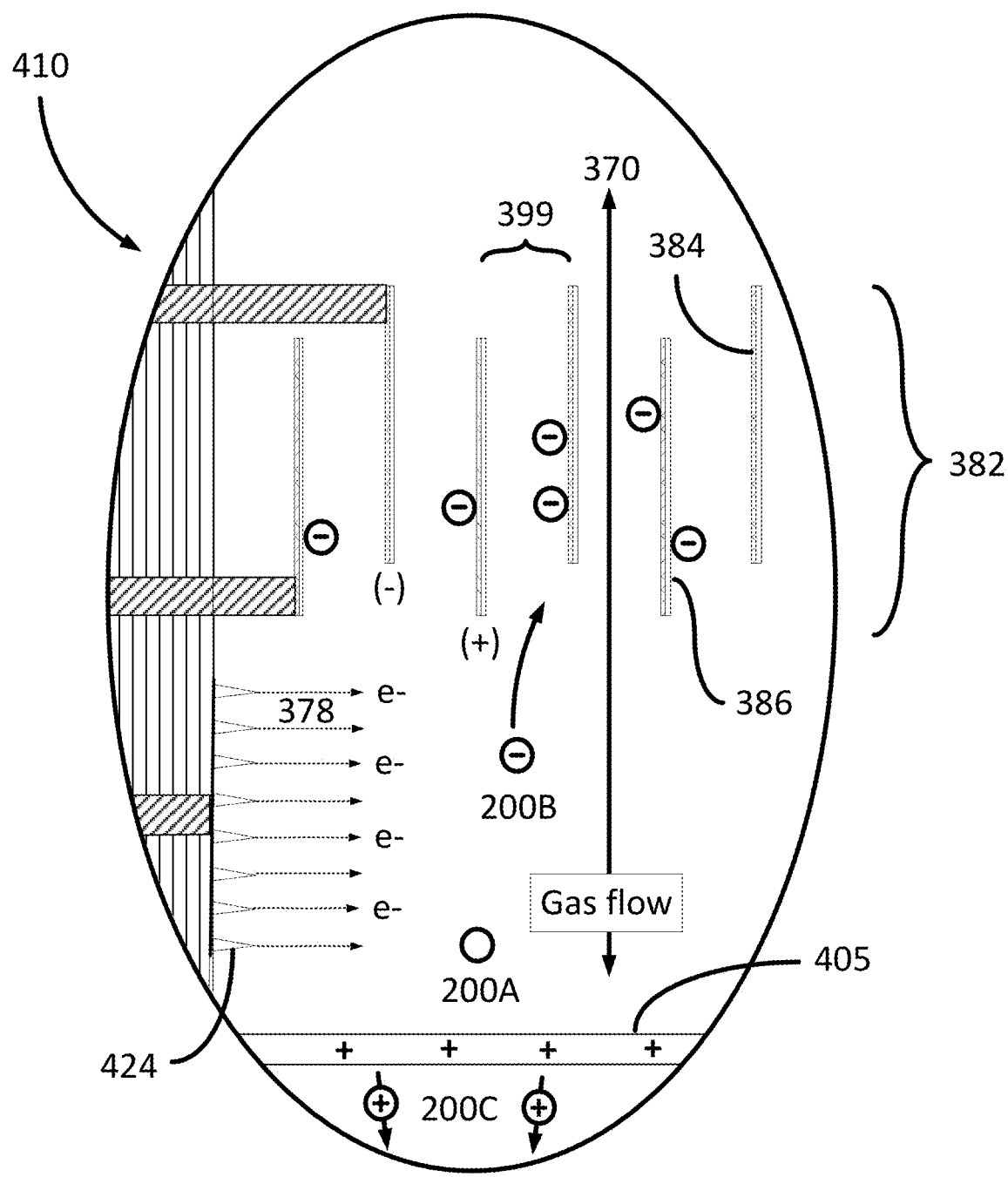

FIGS. 5L and 5M present yet another embodiment of an integrated electromagnetic and electrostatic dust repelling system 420 consistent with embodiment of the present invention. FIG. 5L depicts the integrated electromagnetic and electrostatic dust repelling system 400 of FIG. 5H but with electron emitters 424 disposed along the side of the inner passageway 361. These emitters feature electron-emitting apexes 377 that are oriented horizontally to generate a horizontal curtain of electrons 378 spanning across the passageway 361. Each electron emitting bar 424 need only span approximately 50% of the passageway width to cover the full width. While the embodiment may include multiple emitter bars 424, some variants may use a single bar 424 to generate a complete electron curtain 378. Using multiple emitters may improve charge distribution and system performance.

As shown in FIG. 5M, the particle repelling screen 404 repels positively charged particles 200C, while the remaining particles 200A that pass through the wire spacing 401 become negatively charged upon entering the electron curtain 378. These newly charged particles 200B are then attracted to and filtered by the paired particle retention surfaces 282 when the system 420 is energized.

Figure 5N:
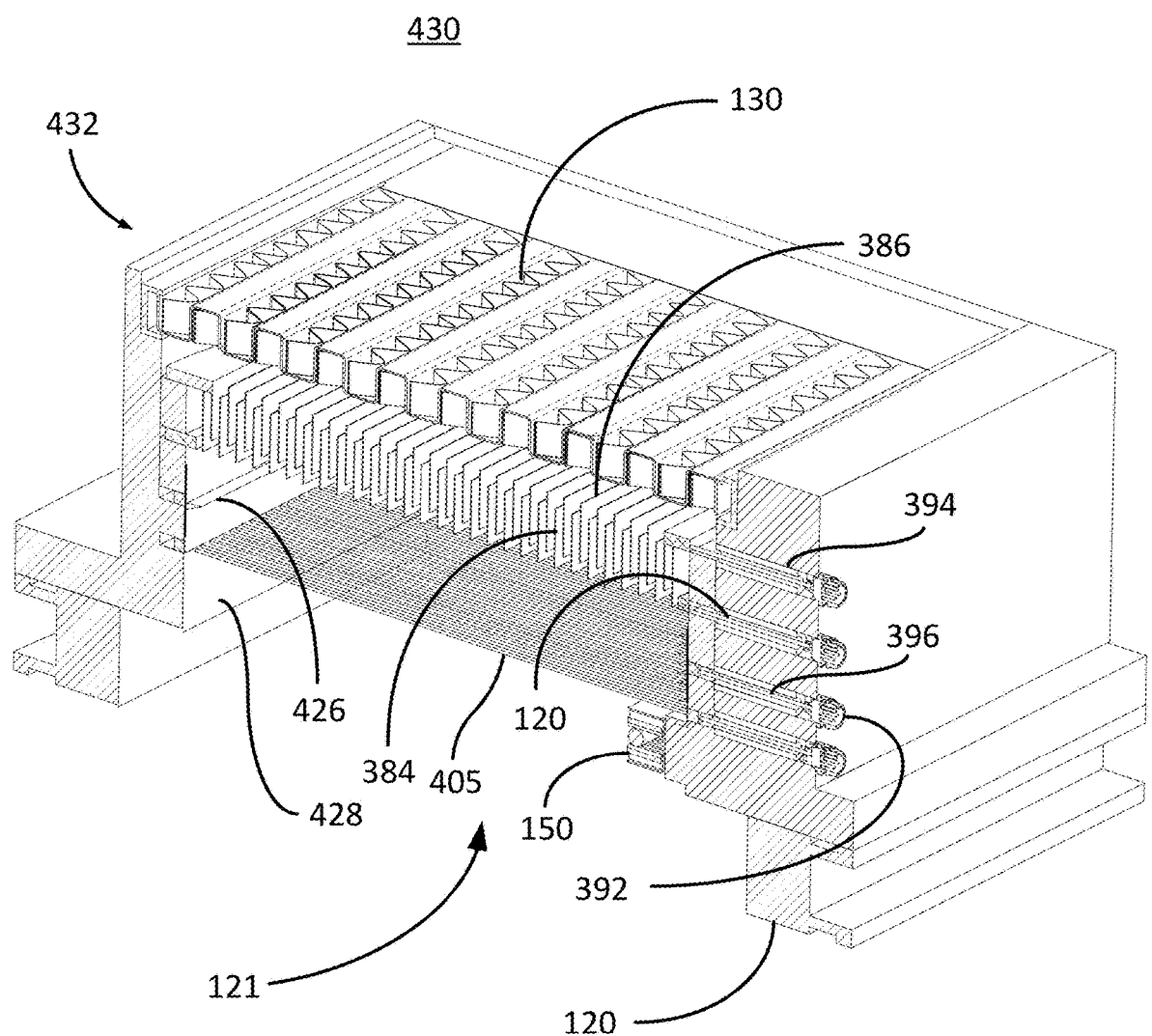
FIG. 5N is a line drawing that illustratively depicts yet another embodiment of an integrated electromagnetic and electrostatic dust repelling system consistent with embodiment of the present invention.

FIG. 5N is a line drawing that illustratively depicts yet another embodiment of an integrated electromagnetic and electrostatic dust repelling system 430 consistent with embodiment of the present invention. This lower dust mitigation chamber housing 432 is rectangular, or optionally square, in shape rather than the cylindrical shaped housing 362 as shown in the previous figures. In this embodiment, there is a straight single electron emitting bar 426 along only one side (the left side) of the internal passageway 328, as shown. Because the internal passageway 328 is rectangular, a single curtain of electrons 378 emitted along one side of the internal passageway 328 is sufficient to fully cover the internal passageway 328. Other configurations may use multiple electron emitting bars 426 placed along the same side of the passageway for improved coverage or redundancy.

With the present description in mind, below are some examples of certain embodiments illustratively complementing some of the apparatus embodiments discussed above and presented in the figures to aid the reader. Accordingly, the elements called out below are provided by example to aid in the understanding of the present invention and should not be considered limiting. The reader will appreciate that the below elements and configurations can be interchangeable within the scope and spirit of the present invention. The illustrative embodiments can include elements from the figures.

In that light, certain embodiment of the present invention contemplates an apparatus 110A for mitigating particle ingress into a gas segregation region 112, which includes a particle intake chamber 362 having an inlet region 121 in gas communication with the gas segregation region 112. Disposed within the chamber 362 is at least one electron emitter bar 374, which comprises tapering sidewalls 373 that terminate at an apex 377. A power source 390 is electrically coupled to the electron emitter bar 374 and is configured to apply a voltage sufficient to emit a curtain of electrons 378 from the apex 377, which negatively charge dust particles 200B passing through the electron curtain. Also coupled to the power source 390 are a plurality of paired particle retention surfaces 382 positioned between the electron emitter bar 374 and the gas segregation region 112. These particle retention surfaces 384, 386 are configured to receive and retain the negatively charged particles 200B when a potential voltage difference is applied to them by the power source 390.

The apparatus 110A further imagines the chamber 362 being in essentially vacuum conditions.

The at least one electron emitter bar 374 of the apparatus 362 is further envisioned to be a plurality of conductive wires 374 arranged as a planar array 375 that span an internal passageway 361 of the particle intake chamber 362. It is further envisioned that each of the apexes 377 of the conductive wires 375 point towards the inlet region 121.

The apparatus 110A further imagines the at least one electron emitter bar 374 being disposed along an internal passageway 361 of the particle intake chamber 362 with the corresponding apex 377 pointing horizontally.

The apparatus 110A further contemplates the particle intake chamber 362 comprising a rectangular internal passageway 428 and the at least one electron emitter bar 426 being disposed along one side of the rectangular internal passageway 428 with the corresponding apex 377 pointing horizontally.

The apparatus 110A can further comprise a final stage filter mesh 130 located between the paired particle retention surfaces 382 and the gas segregation region 112.

The apparatus 110A further imagines that the power source 390 is configured to provide direct current to the at least one electron emitter bar 374 and the paired particle retention surfaces 382.

The apparatus 110A can further comprise a particle repelling screen 404 located between the at least one electron emitter bar 374 and the inlet region 121. The particle repelling screen 404 comprises a planar array of conductive wires 405 that are parallel and spaced apart 401. The planar array of conductive wires 405 are connected to the power supply 390, which is configured to power each of the conductive wires 405 with an alternating current 407 that is phase shifted from the conductive wires 405 that are adjacent. It is further envisioned that the alternating current 407 is coupled with a magnetic field that is configured to sweep iron-based particles 200C in a direction of the alternating current 407 while gravity pulls the particles 200C towards the inlet region 121.

Another embodiment of the present invention contemplates a particle mitigation arrangement 110A includes a particle intake chamber 362 having an inlet region 121 in gas communication with a gas segregation region 112. Disposed within the chamber 362 is at least one electron emitter bar 374, which comprises tapering sidewalls 373 that terminate at an apex 377. A power source 390 is electrically coupled to the electron emitter bar 374 and is configured to emit a curtain of electrons 378 from the apex 377 to negatively charge dust particles 200B as they pass through the electron curtain. A plurality of particle retention surface pairs 382 are positioned between the electron emitter bar 374 and the gas segregation region 112. The power source 390 is also configured to maintain a voltage potential difference between each of the particle retention surface pairs 382 to attract and retain the negatively charged particles 200B. The particle mitigation arrangement 110A further envisions the apex 377 comprising a radius between 5 nm and 50 nm.

The particle mitigation arrangement 110A further envisions the least one electron emitter bar 374 being a plurality of conductive wires 374 that comprise a planar array of conductive wires 375 that span an internal passageway 361 of the particle intake chamber 362, each of the conductive wires 374 having the apex 377 pointing towards the inlet region 121.

The particle mitigation arrangement 110A further imagines the particle retention surface pairs 382 comprising a first set of lower voltage plates 384 and a second set of higher voltage plates 386 configured to be energized with a potential difference between 5 kV and 15 kV DC.

The particle mitigation arrangement 110A further contemplates the at least one electron emitter bar 374 having one or more of the following cross-sectional profiles, as shown in FIG. 5G: a needle-point profile 374A with concave curved sidewalls 373A or a triangular profile 374B with straight sidewalls 373B.

The particle mitigation arrangement 110A can further comprise a final stage filter mesh 130 located between the paired particle retention surfaces 382 and the gas segregation region 112.

The particle mitigation arrangement 110A further envisions comprising a particle repelling screen 404 located between the at least one electron emitter bar 374 and the inlet region 121. The particle repelling screen 404 comprises a planar array of conductive wires 405 that are parallel and spaced apart 401. The planar array of conductive wires 405 are connected to the power supply 390, which is configured to power each of the conductive wires 405 with an alternating current 407 that is phase shifted from the conductive wires 405 that are adjacent. It is further envisioned that the alternating current 407 is coupled with a magnetic field that is configured to sweep iron-based particles 200C in a direction of the alternating current 407 while gravity pulls the particles 200C towards the inlet region 121.

Yet, another embodiment of the present invention contemplates an electrostatic particle filter 110A, which includes a particle intake chamber 362 having an inlet region 121 in gas communication with a gas segregation region 112. Within the chamber 362 is an electron emitter bar 374, which has an apex 377 oriented horizontally. A direct current source 390 is electrically connected to the emitter bar 374. A plurality of parallel particle retention surface pairs 382 are also connected to the direct current source 390 and are positioned between the emitter bar 374 and the gas segregation region 112. The direct current source 390 is configured to maintain each of the particle retention surface pairs 382 at a voltage potential difference.

The electrostatic particle filter 110A further contemplates the electron emitter bar 374 being configured to emit a curtain of electrons 378 from the apex 377 to negatively charge dust particles 200B passing through the electron curtain 378.

The electrostatic particle filter 110A can further comprise a final stage filter mesh 130 located between the paired particle retention surfaces 382 and the gas segregation region 112.

Still, another embodiment of the present invention contemplates an apparatus 110A for repelling iron-based lunar dust particles 200C that comprises a particle intake chamber 420 that includes an inlet region 121 in fluid communication with a gas segregation region 112. Within the internal passageway of the intake chamber 420, a particle repelling screen 404 is suspended. The screen 404 comprises a planar array of conductive wires 405 that are arranged in parallel and spaced apart to form particle passageways 401. A power supply 390 is electrically coupled to the conductive wires 405 and is configured to deliver an alternating current 407 to each of the wires. The alternating current 407 is phase-shifted relative to adjacent wires 405A, 405B, and 405C, creating a time-varying magnetic field 406 that is electromagnetically paired with the alternating current. This magnetic field 406 is configured to generate repulsive forces that displace the iron-based lunar dust particles 200C laterally away from the gas segregation region 112.

The apparatus 110A as presented further envisions the phase shift 412 between the adjacent wires 405A, 405B, 405C being approximately π/10 radians.

The apparatus 110A as presented further imagines the particle repelling screen 404 being suspended above a regolith surface 200 at a height between 10 mm and 30 mm.

The apparatus 110A as presented further envisions each of the conductive wires 405 having a diameter between 10 microns and 300 mils and the particle passageways 401 between the conductive wires 405 being approximately 1 millimeter.

The apparatus 110A as presented further contemplates the power supply 390 being configured to deliver more than 10 kilovolts and a current of approximately 5 Amps at a frequency in the kilohertz range.

The apparatus 110A as presented further imagines the particle repelling screen 404 being configured to also repel positively charged regolith lunar dust particles.

The apparatus 110A as presented further envisions an electron emitter bar 374 disposed within the intake chamber 362 between the particle repelling screen 404 and the gas segregation region 112, the electron emitter bar 374 having a ridge-like apex 377 configured to emit a curtain of electrons 378 when powered with direct current from the power source 390, the curtain of electrons 378 configured to negatively charge dust particles 200B that pass through the particle repelling screen 404.

The apparatus 110A as presented further contemplates a plurality of paired particle retention surfaces 382 disposed between the at least one electron emitter bar 374 and the gas segregation region 112, the particle retention surfaces 382 configured to receive and retain the negatively charged dust particles 200B when a potential voltage difference is applied via the power supply 390 to each of the paired particle retention surfaces 382.

The apparatus 110A as presented further imagines a final stage filter mesh 130 located between the paired particle retention surfaces 382 and the gas segregation region 112.

Another embodiment of the present invention contemplates a particle repelling arrangement 110A that comprises a particle intake chamber 362 having an inlet region 121 in fluid communication with a gas segregation region 112. A particle repelling screen 404 is positioned across an internal passageway 361 of the intake chamber 362. The screen 404 includes a planar array of conductive wires 405, each wire spaced apart from the next to define particle passageways 401. A power supply 390 is electrically coupled to the conductive wires 405. The power supply 390 is configured to deliver alternating current 407 to the wires 405. The alternating current 407 is phase-shifted between adjacent wires 405A, 405B, and 405C. This generates a time-varying magnetic field 406 configured to induce electromagnetic repulsive forces that displace iron-based regolith particles 200C laterally away from the gas segregation region 112.

The particle repelling arrangement 110A as presented further contemplates the phase shift 412 being between the adjacent wires 405A, 405B, 405C is approximately π/10 radians.

The particle repelling arrangement 110A as presented further imagines the conductive wires 405 being configured with non-cylindrical cross-sections to concentrate the magnetic field at their surfaces and enhance repulsive force efficiency.

The particle repelling arrangement 110A as presented further considers the alternating current 407 supplied to the conductive wires 405 varying in frequency across the planar array of conductive wires 405.

The particle repelling arrangement 110A as presented further comprises an electron emitter bar 424 disposed within the intake chamber 362 between the particle repelling screen 404 and the gas segregation region 112, the electron emitter bar 424 having a ridge-like apex 377 configured to emit a curtain of electrons 378 when powered with direct current from the power source 390, the curtain of electrons 378 configured to negatively charged dust particles 200B that pass through the particle repelling screen 404.

The particle repelling arrangement 110A as presented further comprises a plurality of paired particle retention surfaces 382 disposed between the at least one electron emitter bar 424 and the gas segregation region 112, the particle retention surfaces 382 configured to receive and retain the negatively charged dust particles 200B when a potential voltage difference is applied via the power supply 390 to each of the paired particle retention surfaces 382.

The particle repelling arrangement 110A as presented further comprises a final stage filter mesh 130 located between the paired particle retention surfaces 382 and the gas segregation region 112.

Still yet, another embodiment of the present invention contemplates a method is provided for repelling iron-based regolith particles 200C in a particle filtration system 110A. The method includes providing a particle intake chamber 362 that is in fluid communication with a gas segregation region 112. A planar array of conductive wires 405 is suspended across an internal passageway 361 of the intake chamber 362. Alternating current 407 is delivered to the conductive wires 405 using a power supply 390, with the alternating current 407 being phase shifted between adjacent wires 405A, 405B, 405C of the conductive wire array. This alternating current 407 generates a time-varying magnetic field 406, which in turn produces an electromagnetic force. The method continues by repelling the iron-based dust particles 200C laterally away from the gas segregation region 112 using the electromagnetic force generated by the time-varying magnetic field 406.

The method as presented further comprises allowing unrepelled particles to pass through inter-wire spacing 401 of the particle repelling screen 404 into an electron curtain 378 where the particles are negatively charged. This can further include negatively charging the unrepelled particles 200A via an electron field emitter 424.

The method as presented further comprises attracting the negatively charged particles 200B to paired electrostatic retention surfaces 382 powered to have a voltage potential difference by the power supply 390.

Another embodiment of the present invention contemplates a gas collection system 100 that generally comprises a gas segregation chamber 110, at least one cooling plate 105 in the gas segregation chamber 110, an adsorption gas capturing chamber 140 connected to the gas segregation chamber 110 and a carbon adsorber 145 in the adsorption gas capturing chamber 140. The gas segregation chamber 110 comprises a housing 115, wherein the housing 115 is defined by housing sides 116 that extend from a top housing surface 118 to a rim 120. A first interior environment 112 is defined within the housing 115, wherein the first interior environment 142 is in communication with an external environment 102 through only the rim 120. The external environment 102 defined outside of the housing 115. At least one cooling plate 105 is in the gas segregation chamber 110, wherein the least one cooling plate 105 comprises a passageway 122 that is configured to accommodate cryogenic fluid. An adsorption gas capturing chamber 140 is connected to the housing 115, wherein the adsorption gas capturing chamber 140 comprises a second interior environment 142 that is in communication with the first interior environment 112 via a connecting port 132. A carbon adsorber 145 is in the second interior environment 142.

The gas collection system 100 further envisions the carbon adsorber 145 being a cartridge that is removable from the gas collection system 100.

The gas collection system 100 further contemplates that the connecting port 132 leads into a connecting passageway 125 that comprises a valve 126 configured to separate the first interior environment 112 from the second interior environment 142 when closed. One embodiment contemplates the valve 126 being a gate valve. Another embodiment contemplates the carbon adsorber 145 being in communication with the gas segregation chamber 110 only when the valve 126 is open.

Another embodiment of the gas collection system 100 contemplates the adsorption gas capturing chamber 140 being removable from the housing 115.

The gas collection system 100 can further comprise a heating element 150 that is configured to heat granular soil 200 under the rim 120 when the rim 120 rests atop the granular soil 200. One embodiment contemplates the heating element 150 being selected from a group consisting of a laser, a radiant heater, an ultrasonic heater, or a microwave heater.

The gas collection system can further comprise a filter 130 being disposed between the at least one cooling plate 105 and the rim 120, the filter 130 is configured to filter non-gaseous material from entering the first interior environment 112 from the external environment 102.

The gas collection system 100 can further comprise a lower valve 190 that when closed seals the at least one cooling plate 105 from the external environment 102.

The gas collection system 100 further imagines the carbon adsorber being an activated carbon adsorber.

The gas collection system can further comprise a heat sink 144 being in contact with the carbon adsorber 145, wherein the heat sink 144 comprises cryogen feed and return lines 148 that are configured to cool the carbon adsorber 145.

The gas collection system 100 can further comprise a pump 158 and a reservoir 160 that is configured to hold cryogenic liquid.

In another aspect of the present invention, some embodiments envision a gas collection arrangement 100 that generally comprises a gas segregation chamber 110, at least one cooling plate 105 in the gas segregation chamber 110, an adsorption gas capturing chamber 140 and a carbon adsorber 145. The gas segregation chamber 110 defines a first interior environment 112 when a rim 120 of the gas segregation chamber 110 rests atop regolith 200. The gas segregation chamber 110 also comprises at least one cooling plate 105 that is configured to capture higher temperature condensing gas but not low temperature condensing gas, wherein the gases are released from the regolith 200. The adsorption gas capturing chamber 140 defines a second interior environment 142 that is in communication with the first interior environment 112 via a connecting port 132. The carbon adsorber 145 is in the second interior environment 142, wherein the carbon adsorber is configured to capture the low temperature condensing gas.

The gas collection arrangement 100 can further comprise a tank 160 that is configured to contain cryogenic liquid to cool the at least one cooling plate 105 to first temperature and the carbon adsorber 145 to a second temperature that is lower than the first temperature.

The gas collection arrangement 100 further envisioning the low temperature condensing gas being helium and the high temperature gas including hydrogen and oxygen.

The gas collection arrangement 100 can further comprise a heat sink 144 that is connected to the carbon adsorber 145, the heat sink 144 configured to cool the carbon adsorber at or below a temperature at which the low temperature condensing gas condenses.

The gas collection arrangement 100 can further comprise a valve 126 that is between the gas segregation chamber 110 and the adsorption gas capturing chamber 140, the valve 126 is configured to cut off the communication between the first interior environment 112 and the second interior environment 142.

Another embodiment of the present invention contemplates a segregating gas arrangement 100 generally comprising a gas segregation chamber 110, at least one cooling plate 105 in the gas segregation chamber 110, at least one cooling plate 105 in the gas segregation chamber 110, and a carbon adsorber 145. The gas segregation chamber 110 comprises a rim 120 that when resting atop regolith 200 defines a first interior environment 112. The at least one cooling plate 105 is in the gas segregation chamber 110, wherein the least one cooling plate 105 is maintained at a first temperature above 5° K, which is a condensation temperature at which higher temperature condensing gases condense. The adsorption gas capturing chamber 140 defines a second interior environment 142 that is in communication with the first interior environment 112. The carbon adsorber 145 is in the second interior environment 142 and is maintained at a second temperature below 3° K. The carbon adsorber is configured to capture the low temperature condensing gas.

The segregating gas arrangement 100 further contemplates the gas segregation chamber 110 being configured to filter out a majority of the higher temperature condensing gases from entering the adsorption gas capturing chamber 140.

Certain other embodiments of the present invention envision a gas segregating method comprising providing a segregating gas arrangement 100 comprising an adsorption gas capturing chamber 140 that is connected to a gas segregation chamber 110. The gas segregation chamber 110 comprises a housing 115 that is defined by housing sides 116 that extend from a top housing surface 118 to a rim 120. The method further comprises resting the rim 120 atop regolith 200, wherein a first interior environment 112 is defined within the housing when the rim 120 is resting atop the regolith 200. A first temperature above 5° K is maintained in at least one cooling surface 105 that is disposed in the gas segregation chamber 110 and a second temperature below 3° K is maintained at the carbon adsorber 145 in the second interior environment 142. A majority of higher temperature condensing gases are condensed in the first interior environment 112 but not a lower temperature condensing gas is not condensed in the first interior environment 112. The lower temperature condensing gas is captured in a carbon adsorber 145 that is located in the adsorption gas capturing chamber 140, wherein the lower temperature condensing gas migrates from the first interior environment 112 to a second interior environment 142 that is defined within the adsorption gas capturing chamber 140.

The gas segregating method can further comprise a step for removing the adsorption gas capturing chamber 140 from the gas segregation chamber 110.

The gas segregating method can further comprise a step for circulating cryogenic fluid through the at least one cooling surface 105 and through a heat sink 144 that is in contact with the carbon adsorber 145, the cryogenic fluid is held in a reservoir 160 of the segregating gas arrangement 100.

The gas segregating method can further comprise a step for removing the carbon adsorber 145 from the segregating gas arrangement 100.

The gas segregating method can further comprise a step for liberating the higher temperature condensing gases and lower temperature condensing gas from the regolith 200 by heating the regolith with a heater 150 that is cooperating with the segregating gas arrangement 100.

The gas segregating method further envisions the at least one cooling surface 105 being a cooling plate.

It is to be understood that even though numerous characteristics and advantages of various embodiments of the present invention have been set forth in the foregoing description, together with the details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended embodiments are expressed. For example, the orientation of the elements and the plate can include other geometries not explicitly shown in the embodiments above while maintaining essentially the same functionality without departing from the scope and spirit of the present invention. Likewise, the materials and construction of the cooling surfaces 105 and heat sink 145 can be different but serve the same purpose without departing from the scope and spirit of the present invention. It should further be appreciated that the valves do not need to be gate valves but could be other valve construction including more than one valve, the basic construction is well known in the art and modification to present embodiments discussed can be made once a skilled artisan is in possession of the concepts disclosed herein. Moreover, the electronics and computing that enable the functionality of the gas collection system 100 are not described in detail because the electronics and computing elements either exist or are easily constructed by those skilled in the art. Moreover, in regards to the iron-based particle repelling system, different voltages, frequencies, size of wires, varied frequencies, multiple levels, etc., can be used without departing from the scope and spirit of the present invention. It should be appreciated that elements of various embodiments described herein can be combined in obvious manners by a person skilled in the art that understands the content of the present specification without departing from the scope of the subject matter presented herein. Further, the term "one" is synonymous with "a", which may be a first of a plurality.

It will be clear that the present invention is well adapted to attain the ends and advantages mentioned as well as those inherent therein. While presently preferred embodiments have been described for purposes of this disclosure, numerous changes may be made which readily suggest themselves to those skilled in the art and which are encompassed in the spirit of the invention disclosed and as defined in the appended claims.

What is claimed is:

1. An apparatus for mitigating particle ingress in a gas segregation region, the apparatus comprising:
   a particle intake chamber having an inlet region in communication with the gas segregation region;
   at least one electron emitter bar disposed within the chamber, the at least one electron emitter bar comprising tapering sidewalls that terminate at an apex;
   a power source electrically coupled to the at least one electron emitter bar and configured to apply a voltage sufficient to cause a curtain of electrons to be emitted from the apex that negatively charge dust particles; and
   also coupled to the power source are a plurality of paired particle retention surfaces disposed between the at least one electron emitter bar and the gas segregation region, the particle retention surfaces configured to receive and retain the negatively charged dust particles when a potential voltage difference is applied via the power supply to each of the paired particle retention surfaces.

2. The apparatus of claim 1, wherein the inlet region and the gas segregation region are in essentially vacuum conditions.

3. The apparatus of claim 1, wherein the at least one electron emitter bar is a plurality of conductive wires arranged as a planar array that span an internal passageway of the particle intake chamber.

4. The apparatus of claim 3, wherein each of the apexes of the conductive wires point towards the inlet region.

5. The apparatus of claim 1, wherein the at least one electron emitter bar is disposed along an internal passageway of the particle intake chamber with the corresponding apex pointing horizontally.

6. The apparatus of claim 1, wherein the particle intake chamber comprises a rectangular internal passageway and the at least one electron emitter bar is disposed along one side of the rectangular internal passageway with the corresponding apex pointing horizontally.

7. The apparatus of claim 1 further comprising a final stage filter mesh located between the paired particle retention surfaces and the gas segregation region.

8. The apparatus of claim 1, wherein the power source is configured to provide direct current to the at least one electron emitter bar and the paired particle retention surfaces.

9. The apparatus of claim 1 further comprising a particle repelling screen located between the at least one electron emitter bar and the inlet region, the particle repelling screen comprising a planar array of conductive wires that are parallel and spaced apart, the planar array of conductive wires being connected to the power supply which is configured to power each of the conductive wires with an alternating current that is phase shifted from the conductive wires that are adjacent.

10. The apparatus of claim 9, wherein the alternating current is coupled with a magnetic field that is configured to sweep iron-based particles in a direction of the alternating current while gravity pulls the particles towards the inlet region.

11. A particle mitigation arrangement comprising:
a particle intake chamber having an inlet region in gas communication with the gas segregation region;
at least one electron emitter bar disposed within the chamber and comprising tapering sidewalls terminating at an apex;
a power source electrically coupled to the electron emitter bar and configured to emit a curtain of electrons from the apex to negatively charge dust particles that pass through the curtain of electrons; and
a plurality of particle retention surface pairs disposed between the electron emitter bar and the gas segregation region,
the power source is configured to maintain a voltage potential difference between each of the particle retention surface pairs to attract and retain the charged particles.

12. The particle mitigation arrangement of claim 11, wherein the apex comprises a radius between 5 nm and 50 nm.

13. The particle mitigation arrangement of claim 11, wherein the least one electron emitter bar is a plurality of conductive wires that comprise a planar array of conductive wires that span an internal passageway of the particle intake chamber, each of the conductive wires having the apex pointing towards the inlet region.

14. The particle mitigation arrangement of claim 11, wherein the particle retention surface pairs comprise a first set of lower voltage plates and a second set of higher voltage plates configured to be energized with a potential difference between 5 kV and 15 kV DC.

15. The particle mitigation arrangement of claim 11, wherein the at least one electron emitter bar has one or more of the following cross-sectional profiles: a needle-point profile with concave curved sidewalls or a triangular profile with straight sidewalls.

16. The particle mitigation arrangement of claim 11 further comprising a final stage filter mesh located between the paired particle retention surfaces and the gas segregation region.

17. The particle mitigation arrangement of claim 11 further comprising a particle repelling screen located between the at least one electron emitter bar and the inlet region, the particle repelling screen comprising a planar array of conductive wires that are parallel and spaced apart, the planar array of conductive wires being connected to the power supply which is configured to power each of the conductive wires with an alternating current that is phase shifted from the conductive wires that are adjacent.

18. An electrostatic particle filter comprising:
a particle intake chamber having an inlet region in gas communication with a gas segregation region;
an electron emitter bar having an apex that points horizontally within the chamber;
a direct current source electrically connected to the emitter bar; and
a plurality of parallel particle retention surface pairs connected to the direct current source and disposed between the emitter bar and the gas segregation region, the direct current source configured to maintain each of the particle retention surface pairs at a voltage potential difference.

19. The electrostatic particle filter of claim 18, wherein the electron emitter bar is configured to emit a curtain of electrons from the apex to negatively charge dust particles passing through the electron curtain.

20. The electrostatic particle filter of claim 18 further comprising a final stage filter mesh located between the paired particle retention surfaces and the gas segregation region.

* * * * *